(12) United States Patent
Yu et al.

(10) Patent No.: US 12,444,470 B2
(45) Date of Patent: Oct. 14, 2025

(54) NONVOLATILE MEMORY DEVICE AND OPERATING METHOD THEREOF

(71) Applicant: Samsung Electronics Co., Ltd., Suwon-si (KR)

(72) Inventors: Jaeduk Yu, Suwon-si (KR); Jonghoon Park, Suwon-si (KR); Yohan Lee, Suwon-si (KR); Sangsoo Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 131 days.

(21) Appl. No.: 18/532,730

(22) Filed: Dec. 7, 2023

(65) Prior Publication Data

US 2024/0221844 A1     Jul. 4, 2024

(30) Foreign Application Priority Data

Jan. 3, 2023   (KR) ........................ 10-2023-0000903

(51) Int. Cl.
| | |
|---|---|
| *G11C 7/00* | (2006.01) |
| *G11C 16/04* | (2006.01) |
| *G11C 16/08* | (2006.01) |
| *G11C 16/26* | (2006.01) |

(52) U.S. Cl.
CPC .......... *G11C 16/26* (2013.01); *G11C 16/0433* (2013.01); *G11C 16/08* (2013.01)

(58) Field of Classification Search
CPC ...... G11C 16/26; G11C 16/0433; G11C 16/08
USPC .................................................... 365/189.011
See application file for complete search history.

(56) References Cited

U.S. PATENT DOCUMENTS

| | | | |
|---|---|---|---|
| 9,136,005 B2 * | 9/2015 | Choe ................. | G11C 16/0483 |
| 9,142,313 B2 | 9/2015 | Shim et al. | |
| 9,165,660 B2 * | 10/2015 | Lee .................... | G11C 16/3427 |
| 9,190,151 B2 | 11/2015 | Nam et al. | |
| 9,378,833 B2 * | 6/2016 | Han ...................... | G11C 16/26 |
| 9,508,441 B1 * | 11/2016 | Nam ................. | G11C 16/0483 |
| 9,805,807 B2 | 10/2017 | Lee et al. | |
| 10,163,511 B2 * | 12/2018 | Nam ................... | G11C 11/4087 |
| 10,573,386 B2 * | 2/2020 | Kim ...................... | G11C 16/10 |
| 10,629,267 B2 * | 4/2020 | Lee .................... | G11C 16/0483 |
| 10,672,454 B2 | 6/2020 | Kwak et al. | |
| 10,832,782 B2 | 11/2020 | Park | |
| 11,056,196 B2 | 7/2021 | Liang et al. | |

(Continued)

*Primary Examiner* — Viet Q Nguyen
(74) *Attorney, Agent, or Firm* — Harness, Dickey & Pierce, P.L.C.

(57) ABSTRACT

Provided is an operating method of a nonvolatile memory device. The operating method includes receiving a read command, increasing a voltage applied to a plurality of unselected ground selection lines from an off voltage to an on voltage during a word line setup period, applying a first voltage to a first selected ground selection line corresponding to a first process characteristic, until a first time in the word line setup period, applying a second voltage to the first selected ground selection line after the first time in the word line setup period, applying the first voltage to a second selected ground selection line corresponding to a second process characteristic, until a second time earlier than the first time in the word line setup period, and applying the second voltage to the second selected ground selection line after the second time in the word line setup period.

20 Claims, 19 Drawing Sheets

(56) References Cited

U.S. PATENT DOCUMENTS

| | | | |
|---|---|---|---|
| 11,205,471 B2* | 12/2021 | Choi | G11C 16/26 |
| 11,532,365 B2* | 12/2022 | Yu | G11C 16/08 |
| 11,615,855 B2* | 3/2023 | Choi | H01L 25/18 |
| | | | 365/185.02 |
| 12,040,020 B2* | 7/2024 | Choi | G11C 16/14 |
| 12,062,395 B2* | 8/2024 | Lee | G11C 16/08 |
| 2016/0336075 A1* | 11/2016 | Lee | G11C 16/0483 |

* cited by examiner

NONVOLATILE MEMORY DEVICE AND OPERATING METHOD THEREOF

CROSS-REFERENCE TO RELATED APPLICATION

This application is based on and claims priority under 35 U.S.C. § 119 to Korean Patent Application No. 10-2023-0000903, filed on Jan. 3, 2023, in the Korean Intellectual Property Office, the disclosure of which is incorporated by reference herein in its entirety. a

BACKGROUND

The inventive concepts relate to nonvolatile memory devices, and more particularly, to nonvolatile memory devices capable of adjusting a pre pulse recovery operation and operating methods of the nonvolatile memory device.

A system using semiconductor chips widely uses a dynamic random access memory (DRAM) as a working memory or main memory of the system and uses a storage device as a storage medium in order to store data or instructions used by a host in the system and/or to perform a computational operation. A storage device includes a nonvolatile memory. As the capacity of storage devices has increased, the number of memory cells and word lines stacked on a substrate of a nonvolatile memory has increased and the number of bits of data stored in a memory cell has also increased. In order to improve the storage capacity and integration degree of a memory, a nonvolatile memory device in which memory cells are stacked in a three-dimensional (3D) structure, such as a 3D NAND flash memory device, has been researched.

In the case of a read operation, channel boosting by word lines occurs and thus hot carrier injection occurs. In order to prevent this, a pre pulse operation for turning on a transistor connected to each of word lines, string selection lines, and ground selection lines may be performed. However, because the pre pulse operation consumes time and power, it is necessary to perform a pre pulse recovery operation after the pre pulse operation, to return to a state prior to the pre pulse operation.

SUMMARY

The inventive concepts provide nonvolatile memory devices capable of adjusting a pre pulse recovery operation and operating methods of the nonvolatile memory device.

According to some aspects of the inventive concepts, there is provided an operating method of a nonvolatile memory device including a plurality of cell strings connected to a plurality of word lines, a plurality of string selection lines, and a plurality of ground selection lines, the operating method including receiving a read command, in response to the read command, increasing a voltage of a plurality of unselected ground selection lines from an off voltage to an on voltage during a word line setup period, applying a first voltage to a first selected ground selection line corresponding to a first process characteristic among a plurality of selected ground selection lines until a first time in the word line setup period, applying a second voltage to the first selected ground selection line after the first time in the word line setup period, applying the first voltage to a second selected ground selection line corresponding to a second process characteristic among the plurality of selected ground selection lines until a second time earlier than the first time in the word line setup period, and applying the second voltage to the second selected ground selection line after the second time in the word line setup period.

According to some aspects of the inventive concepts, there is provided an operating method of a nonvolatile memory device including a plurality of cell strings connected between a plurality of bit lines and a plurality of common source lines, the operating method including receiving a read command, in response to the read command, increasing a voltage of a plurality of unselected ground selection lines from an off voltage to an on voltage during a word line setup period, increasing a voltage of a plurality of selected ground selection lines to a pre pulse voltage by applying a first voltage to the plurality of selected ground selection lines until a first time in the word line setup period, and decreasing the voltage of the plurality of selected ground selection lines to the off voltage by equally controlling a voltage gradient after the first time.

According to some aspects of the inventive concepts, there is provided a nonvolatile memory device including a memory cell array including a plurality of cell strings connected to a plurality of word lines, a plurality of string selection lines, and a plurality of ground selection lines, and a control circuit configured to control the memory cell array such that a voltage of a plurality of unselected ground selection lines increases from an off voltage to an on voltage during a word line setup period in response to a read command, a first voltage is applied to a first selected ground selection line corresponding to a first process characteristic among a plurality of selected ground selection lines until a first time in the word line setup period, a second voltage is applied to the first selected ground selection line after the first time in the word line setup period, the first voltage is applied to a second selected ground selection line corresponding to a second process characteristic among the plurality of selected ground selection lines until a second time earlier than the first time in the word line setup period, and the second voltage is applied to the second selected ground selection line after the second time in the word line setup period.

According to some aspects of the inventive concepts, there is provided an operating method of a nonvolatile memory device including a plurality of cell strings connected to a plurality of word lines, a plurality of string selection lines, and a plurality of ground selection lines, the operating method including receiving a read command, in response to the read command, increasing a voltage of a plurality of unselected ground selection lines from an off voltage to an on voltage during a word line setup period, applying a first voltage to a first selected ground selection line corresponding to a first process characteristic among a plurality of selected ground selection lines during a first pre pulse setup period in the word line setup period, applying a second voltage to the first selected ground selection line during a first pre pulse recovery period after the first pre pulse setup period in the word line setup period, applying the first voltage to a second selected ground selection line corresponding to a second process characteristic among the plurality of selected ground selection lines during a second pre pulse setup period shorter than the first pre pulse setup period in the word line setup period, and applying the second voltage to the second selected ground selection line during a second pre pulse recovery period longer than the first pre pulse recovery period after the second pre pulse setup period in the word line setup period.

BRIEF DESCRIPTION OF THE DRAWINGS

Example embodiments will be more clearly understood from the following detailed description taken in conjunction with the accompanying drawings in which.

DETAILED DESCRIPTION OF THE EMBODIMENTS

Hereinafter, various example embodiments will be described with reference to the accompanying drawings.

Figure 1:
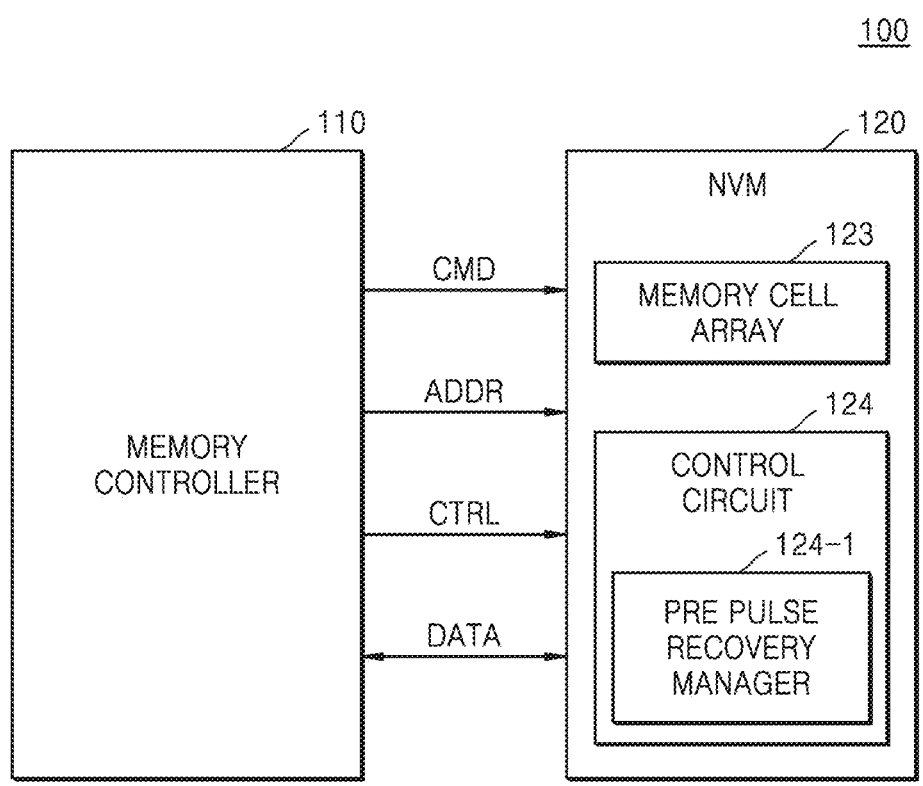
FIG. 1 is a block diagram illustrating a memory system according to example embodiments.

FIG. 1 is a block diagram illustrating a memory system according to example embodiments.

Referring to FIG. 1, a memory system 100 may include a memory controller 110 and a memory device 120. In some example embodiments, a plurality of conceptual hardware components included in the memory system 100 are illustrated; however, the inventive concepts are not limited thereto, and other components may also be included therein. The memory controller 110 may control the memory device 120 to write data into the memory device 120 in response to a write request from a host or may control the memory device 120 to read data stored in the memory device 120 in response to a read request from the host.

In some example embodiments, the memory system 100 may be an internal memory embedded in an electronic device. For example, the memory system 100 may be an embedded universal flash storage (UFS) memory device, an embedded multimedia card (eMMC), or a solid state drive (SSD). In some example embodiments, the memory system 100 may be an external memory detachable from an electronic device. For example, the memory system 100 may include at least one of a UFS memory card, Compact Flash (CF), Secure Digital (SD), Micro Secure Digital (Micro-SD), Mini Secure Digital (Mini-SD), extreme Digital (xD), and a memory stick.

The memory device 120 may perform an erase, program, or read operation under control by the memory controller 110. Through an input/output line, the memory device 120 may receive a command CMD and an address ADDR from the memory controller 110 and transmit/receive data for a program operation or a read operation to/from the memory controller 110. Also, the memory device 120 may receive a control signal CTRL through a control line. The memory device 120 may include a memory cell array 123 and a control circuit 124.

The memory cell array 123 may include a plurality of memory blocks, and each of the plurality of memory blocks may include a plurality of memory cells; for example, the plurality of memory cells may be flash memory cells. Hereinafter, some example embodiments will be described in detail by taking as an example the case where the plurality of memory cells are NAND flash memory cells. The memory cell array 123 may include a three-dimensional (3D) memory cell array including a plurality of cell strings, which will be described in detail with reference to FIGS. 3 to 5.

Figure 4:
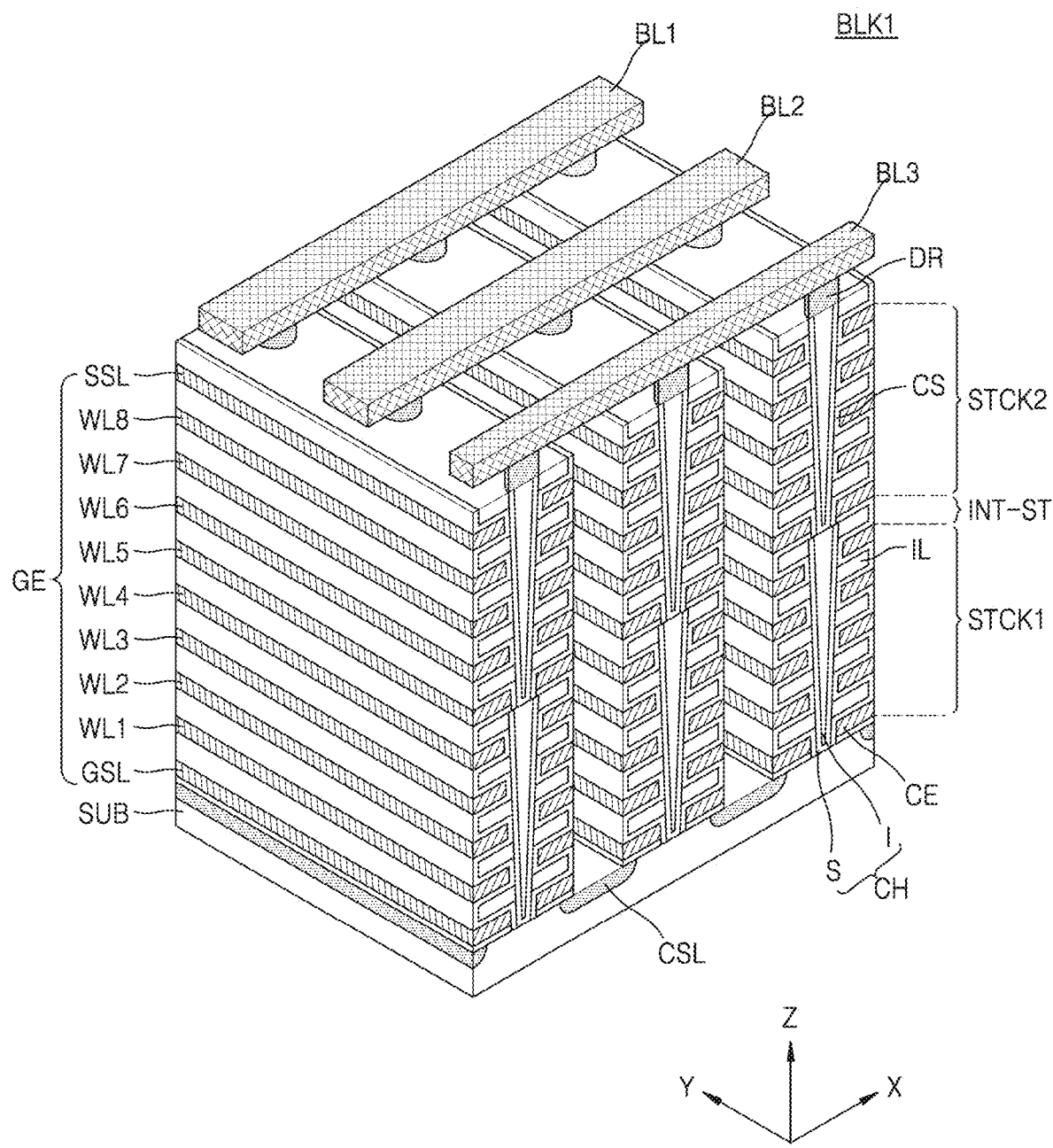
FIG. 4 is a perspective view illustrating a memory block according to some example embodiments.

As illustrated in FIG. 4, the memory block in the memory cell array 123 may include a first memory stack STCK1 and a second memory stack STCK2 stacked in a vertical direction with respect to a substrate.

The control circuit 124 of FIG. 1 may perform a read operation on a selected memory cell among the memory cells included in the 3D memory cell array 123, according to a read command from the memory controller 110.

The control circuit 124 may control a read operation of the memory device 120 according to a read command from the memory controller 110. In the read operation, a pre pulse operation may be performed on a ground selection line, a string selection line, a word line, and/or the like for reasons such as preventing or reducing a read error of the memory device 120. Herein, the pre pulse operation may refer to an operation of applying a voltage for turning on a transistor to a word line, a string selection line, a ground selection line, and/or the like in order to prevent or reduce hot carrier injection by channel boosting.

The control circuit 124 may include a pre pulse recovery manager 124-1. The pre pulse recovery manager 124-1 may perform control such that a pre pulse recovery operation is performed after the pre pulse operation on a word line, a string selection line, a ground selection line, and/or the like connected to the cell strings. Herein, the pre pulse recovery operation may refer to an operation of applying a voltage for turning off a transistor to a word line, a string selection line, a ground selection line, and/or the like in order to return to a previous state before the pre pulse operation. For example, in the pre pulse operation, 10V may be applied to a selected word line and thus the voltage of the selected word line may increase from a ground voltage to a pre pulse voltage of 3 V with time. In this case, the pre pulse recovery operation may refer to an operation in which 0V is applied to a selected ground selection line and thus the voltage of the selected word line decreases from a pre pulse voltage of 3 V to the ground voltage with time.

In some example embodiments, the pre pulse recovery manager 124-1 may perform control such that a first voltage is applied to a first selected ground selection line corresponding to a first process characteristic among a plurality of selected ground selection lines connected to a memory cell array until a first time in the word line setup period. Here, the first process characteristic may contrast with a second process characteristic and may refer to a characteristic that is more resistant to hot carrier injection than the second process characteristic. For example, the first process characteristic may refer to a case where a channel diameter is short, a case where a word line thickness is small, a case where an inter-wordline distance is long, or a case where a wordline-to-channel distance is short, compared to the second process characteristic.

The pre pulse recovery manager 124-1 may control the pre pulse recovery operation by performing control such that a second voltage lower than the first voltage is applied to the first selected ground selection line after the first time in the word line setup period.

Also, the pre pulse recovery manager 124-1 may control the pre pulse recovery operation by performing control such that the first voltage is applied to a second selected ground selection line corresponding to the second process characteristic among the plurality of selected ground selection lines until a second time earlier than the first time in the word line setup period and the second voltage is applied to the second selected ground selection line after the second time in the word line setup period.

In some example embodiments, the pre pulse recovery manager 124-1 may control the pre pulse recovery operation by performing control to increase the voltage of the plurality of selected ground selection lines to a pre pulse voltage by applying the first voltage to the plurality of selected ground selection lines until the first time in the word line setup period and to decrease the voltage of the selected ground selection lines to an off voltage by equally controlling the voltage gradient of the selected ground selection lines after the first time.

In the example of FIG. 1, the pre pulse recovery manager 124-1 is illustrated as being included in the control circuit 124; however, the pre pulse recovery manager 124-1 according to some example embodiments may be implemented as a separate component outside the control circuit 124.

Figure 2:
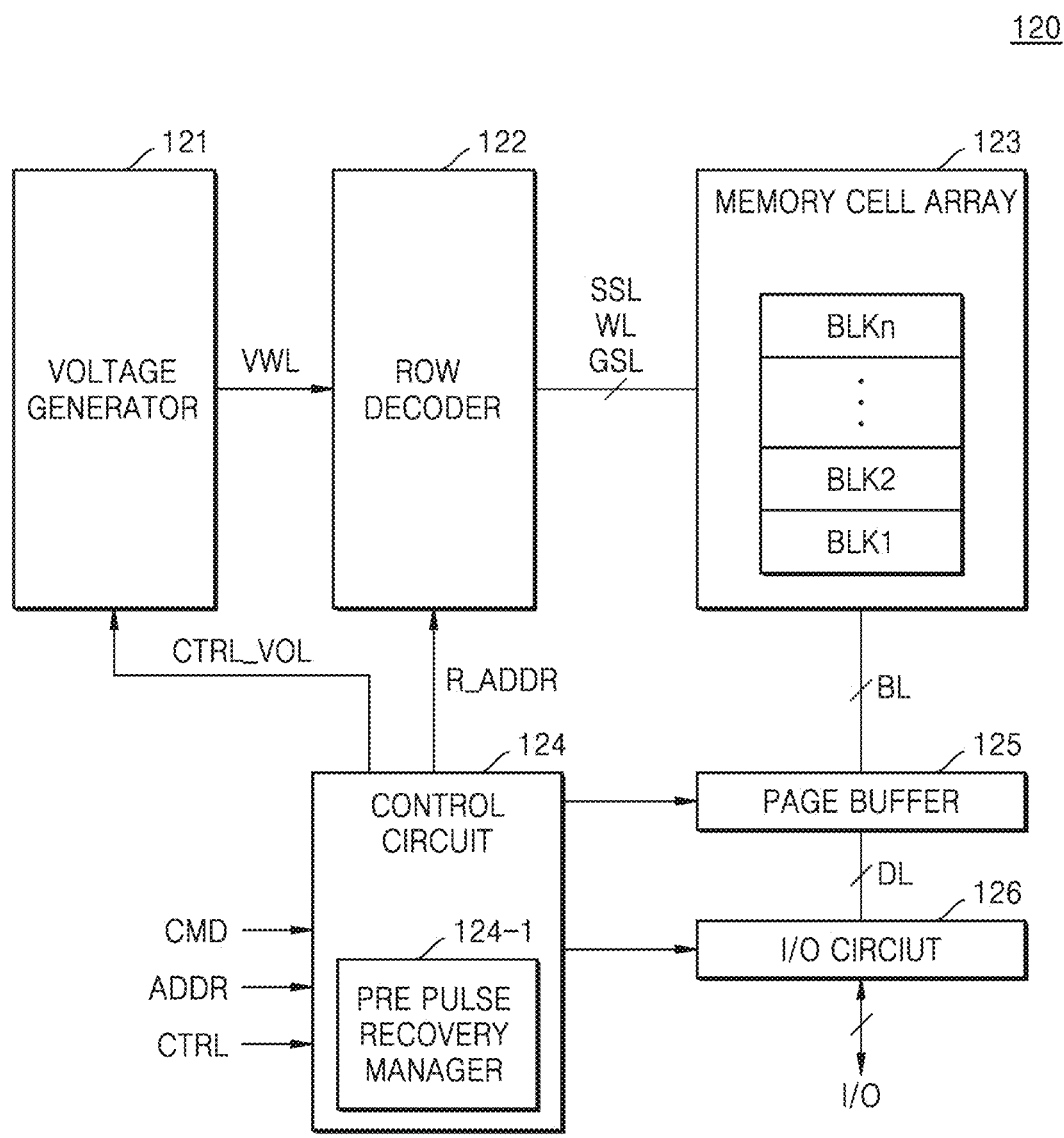
FIG. 2 is a block diagram illustrating a memory device according to example embodiments.

FIG. 2 is a block diagram illustrating a memory device according to example embodiments. FIG. 2 illustrates a schematic configuration of a flash memory device. It should be note that the configuration of the flash memory device illustrated in FIG. 2 is provided as an example and is not necessarily an actual flash memory device configuration. Also, the configuration of the flash memory device illustrated in FIG. 2 does not represent or suggest limitations on the inventive concepts. For convenience of description, a memory device 120 may be interchanged with a flash memory device 120.

Referring to FIGS. 1 and 2, the memory device 120 may include a memory cell array 123, a row decoder 122, a control circuit 124, a page buffer 125, an input/output (I/O) circuit 126, and a voltage generator 121. Although not illustrated, the memory device 120 may further include an input/output interface.

The memory cell array 123 may be connected to word lines WL, string selection lines SSL, ground selection lines GSL, and bit lines BL. The memory cell array 123 may be connected to the row decoder 122 through the word lines WL, the string selection lines SSL, and the ground selection lines GSL may be connected to the page buffer 125 through the bit lines BL. The memory cell array 123 may include a plurality of memory blocks BLK1 to BLKn.

Each of the memory blocks BLK1 to BLKn may include a plurality of memory cells and a plurality of selection transistors. The memory cells may be connected to the word lines WL, and the selection transistors may be connected to the string selection lines SSL or the ground selection lines GSL. Each of the memory cells may store one or more bits, and as an example, each memory cell may correspond to a multi-level cell (MLC), a triple-level cell (TLC), or a quad-level cell (QLC).

The row decoder 122 may be connected to the memory cell array 123 through a plurality of string selection lines SSL, a plurality of word lines WL, and a plurality of ground selection lines GSL. In a program operation or a read operation, based on a row address R_ADDR received from the control circuit 124, the row decoder 122 may determine one of the plurality of word lines WL as a selected word line and determine the other word lines as unselected word lines. In the program operation or the read operation, based on the row address R_ADDR received from the control circuit 124, the row decoder 122 may determine one of the plurality of string selection lines SSL as a selected string selection line and determine the other string selection lines as unselected string selection lines.

Based on the command CMD, the address ADDR, and the control signal CTRL received from the memory controller 110, the control circuit 124 may output various internal control signals for performing program, read, and erase operations on the memory cell array 123. The control circuit 124 may provide a row address R_ADDR to the row decoder 122, may provide a column address to the input/output circuit 126, and may provide a voltage control signal CTRL_VOL to the voltage generator 121.

The control circuit 124 may include a pre pulse recovery manager 124-1 for controlling a pre pulse recovery operation of the memory device 120. The pre pulse recovery manager 124-1 may perform control such that a pre pulse recovery operation is performed on the string selection line, the ground selection line, the word line, and/or the like connected to the memory cell array. The pre pulse recovery manager 124-1 may collectively refer to hardware, firmware, software, or any combination thereof for controlling or managing a pre pulse recovery operation on the string selection line, the ground selection line, the word line, and/or the like connected to the memory cell array.

In some example embodiments, it will be described that the pre pulse recovery manager 124-1 controls a pre pulse recovery operation of the memory device 120; however, some example embodiments are not limited thereto. For example, the pre pulse recovery manager 124-1 may correspond to the component included in the control circuit 124, and the control circuit 124 may be described as controlling the pre pulse recovery operation.

The page buffer 125 may operate as a write driver or as a sense amplifier according to an operation mode. In the read operation, the page buffer 125 may sense a bit line BL of the selected memory cell under control by the control circuit 124. The sensed data may be stored in latches included in the page buffer 125. The page buffer 125 may transmit the data stored in the latches to the input/output circuit 126 through a data line DL under control by the control circuit 124.

The input/output circuit 126 may be connected to the page buffer 125 through data lines DL. In the program operation, the input/output circuit 126 may receive program data from the memory controller 110 and provide the program data to the page buffer 125 based on the column address received from the control circuit 124. In the read operation, the input/output circuit 126 may provide the read data stored in the page buffer 125 to the memory controller 110 based on the column address received from the control circuit 124.

The voltage generator 121 may generate various types of voltages for performing program, read, and erase operations on the memory cell array 123 based on the voltage control signal CTRL_VOL. Particularly, the voltage generator 121 may generate a word line voltage VWL such as a program voltage, a verify voltage, a read voltage, a pass voltage, an erase voltage, and/or an erase verify voltage.

Figure 3:
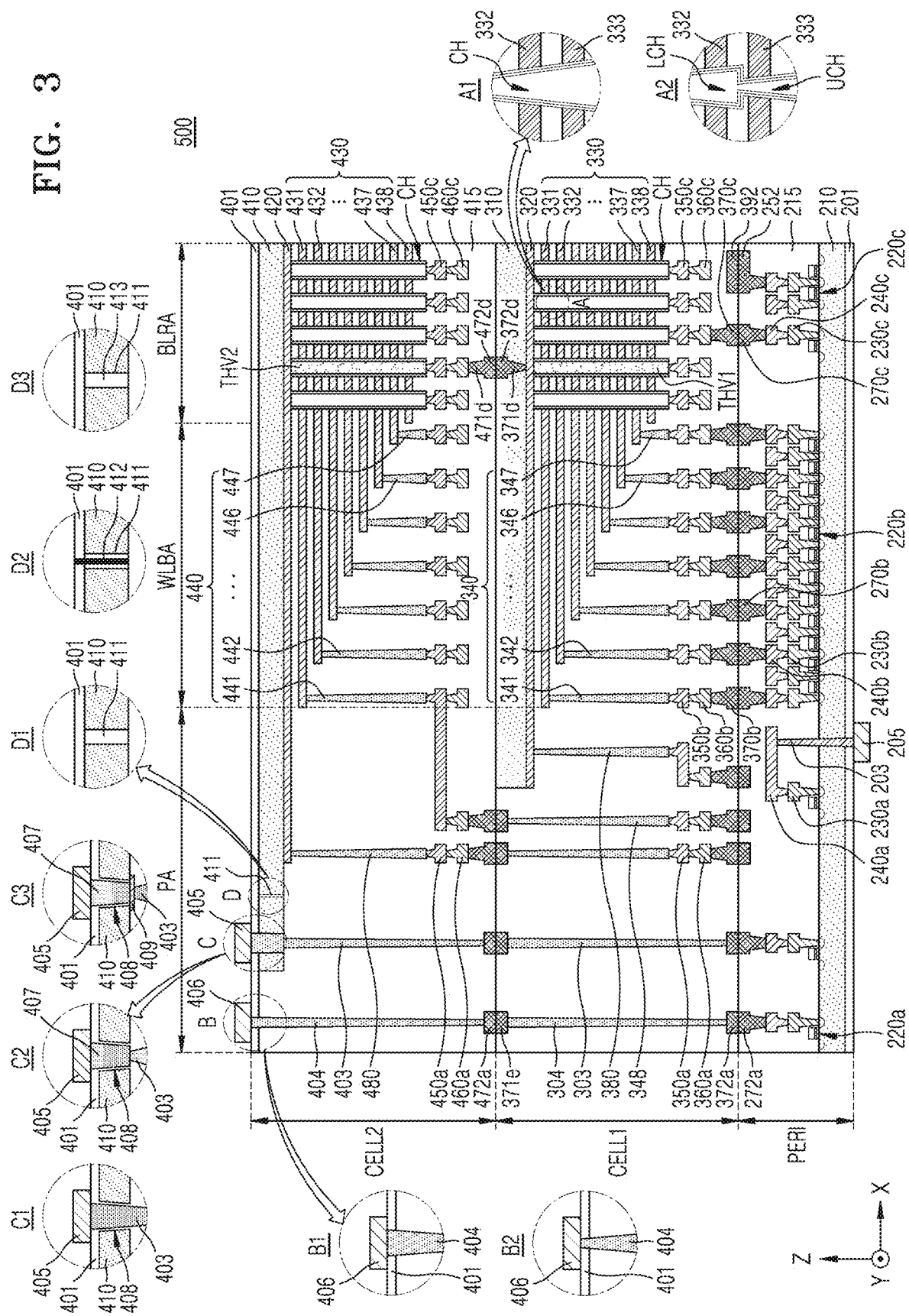
FIG. 3 is a diagram for describing a memory device according to some example embodiments.

FIG. 3 is a diagram for describing a memory device according to some example embodiments.

Referring to FIG. 3, a memory device 500 may have a chip-to-chip (C2C) structure. Here, the C2C structure may refer to separately manufacturing at least one upper chip including a cell area CELL and at least one lower chip including a peripheral circuit area PERI and then connecting the at least one upper chip and the at least one lower chip to each other by bonding. For example, the bonding may refer to a method of electrically or physically connecting a bonding metal pattern formed in an uppermost metal layer of an upper chip to a bonding metal pattern formed in an uppermost metal layer of a lower chip. For example, when the bonding metal patterns are formed of copper (Cu), the bonding may be Cu—Cu bonding. As another example, the bonding metal patterns may also be formed of aluminum (Al) or tungsten (W).

The memory device 500 may include at least one upper chip including a cell area. For example, as illustrated in FIG. 3, the memory device 500 may be implemented to include two upper chips. However, this is merely an example, and the number of upper chips is not limited thereto. When the memory device 500 is implemented to include two upper chips, the memory device 500 may be manufactured by separately manufacturing a first upper chip including a first cell area CELL1, a second upper chip including a second cell area CELL2, and a lower chip including a peripheral circuit area PERI and then connecting the first upper chip, the second upper chip, and the lower chip to each other by bonding. The first upper chip may be inverted and connected to the lower chip by bonding, and the second upper chip may also be inverted and connected to the first upper chip by bonding. In the following description, the upper and lower portions of the first and second upper chips are defined based on before the first upper chip and the second upper chip are inverted. That is, in FIG. 3, the upper portion of the lower chip may refer to the upper portion defined based on the +Z-axis direction, and the upper portion of each of the first and second upper chips may refer to the upper portion defined based on the −Z-axis direction. However, this is merely an example, and only one of the first upper chip and the second upper chip may be inverted and connected by bonding.

Each of the peripheral circuit area PERI and the first and second cell areas CELL1 and CELL2 of the memory device 500 may include an external pad bonding area PA, a word line bonding area WLBA, and a bit line bonding area BLBA.

The peripheral circuit area PERI may include a first substrate 210 and a plurality of circuit elements 220a, 220b, and 220c formed on the first substrate 210. An interlayer insulating layer 215 including one or more insulating layers may be provided over the plurality of circuit elements 220a, 220b, and 220c, and a plurality of metal lines connecting the plurality of circuit elements 220a, 220b, and 220c may be provided in the interlayer insulating layer 215. For example, the plurality of metal lines may include first metal lines 230a, 230b, and 230c respectively connected to the plurality of circuit elements 220a, 220b, and 220c, and second metal lines 240a, 240b, and 240c formed over the first metal lines 230a, 230b, and 230c. The plurality of metal lines may include at least one of various conductive materials. For example, the first metal lines 230a, 230b, and 230c may be formed of tungsten having a relatively high electrical resistivity, and the second metal lines 240a, 240b, and 240c may be formed of copper having a relatively low electrical resistivity.

Herein, only the first metal lines 230a, 230b, and 230c and the second metal lines 240a, 240b, and 240c are illustrated and described; however, the inventive concepts are not limited thereto, and at least one or more additional metal lines may be further formed over the second metal layers 240a, 240b, and 240c. In this case, the second metal lines 240a, 240b, and 240c may be formed of aluminum. Also, at least some of the additional metal lines formed over the second metal lines 240a, 240b, and 240c may be formed of copper having a lower electrical resistivity than the aluminum of the second metal lines 240a, 240b, and 240c.

The interlayer insulating layer 215 may be arranged over the first substrate 210 and may include an insulating material such as silicon oxide or silicon nitride.

Each of the first and second cell areas CELL1 and CELL2 may include at least one memory block. The first cell area CELL1 may include a second substrate 310 and a common source line 320. Over the second substrate 310, a plurality of word lines 330 (331 to 338) may be stacked in a direction (Z-axis direction) perpendicular to the upper surface of the second substrate 310. String selection lines and a ground selection line may be arranged over and under the word lines 330, and the plurality of word lines 330 may be arranged between the string selection lines and the ground selection line. Likewise, the second cell area CELL2 may include a third substrate 410 and a common source line 420, and a plurality of word lines 430 (431 to 438) may be stacked in a direction (Z-axis direction) perpendicular to the upper surface of the third substrate 410. The second substrate 310 and the third substrate 410 may include various materials and may include, for example, a substrate including a silicon substrate, a silicon-germanium substrate, a germanium substrate, or a monocrystalline epitaxial layer grown on a monocrystalline silicon substrate. A plurality of channel structures CH may be formed in each of the first and second cell areas CELL1 and CELL2.

In some example embodiments, as illustrated in A1 of FIG. 3, the channel structure CH may be provided in the bit line bonding area BLBA and may extend in a direction perpendicular to the upper surface of the second substrate 310 to pass through the word lines 330, the string selection lines, and the ground selection line. The channel structure CH may include a data storage layer, a channel layer, and a buried insulating layer. The channel layer may be electrically connected to a first metal line 350c and a second metal line 360c in the bit line bonding area BLBA. For example, the second metal line 360c may be a bit line and may be connected to the channel structure CH through the first metal line 350c. The bit line 360c may extend in a first direction (Y-axis direction) parallel to the upper surface of the second substrate 310.

In some example embodiments, as illustrated in A2 of FIG. 3, the channel structure CH may include a lower channel LCH and an upper channel UCH connected to each other. For example, the channel structure CH may be formed through a process for the lower channel LCH and a process for the upper channel UCH. The lower channel LCH may extend in a direction perpendicular to the upper surface of the second substrate 310 to pass through the common source line 320 and the lower word lines 331 and 332. The lower channel LCH may include a data storage layer, a channel layer, and a buried insulating layer and may be connected to the upper channel UCH. The upper channel UCH may pass through the upper word lines 333 to 338. The upper channel UCH may include a data storage layer, a channel layer, and a buried insulating layer, and the channel layer of the upper channel UCH may be electrically connected to the first metal line 350*c* and the second metal line 360*c*. As the length of the channel increases, it may be difficult to form a channel having a uniform width due to process reasons. The memory device 500 according to some example embodiments may include a channel having improved width uniformity through the lower channel LCH and the upper channel UCH formed through a sequential process.

As illustrated in A2 of FIG. 3, when the channel structure CH is formed to include the lower channel LCH and the upper channel UCH, the word line located near the boundary between the lower channel LCH and the upper channel UCH may be a dummy word line. For example, the word line 332 and word line 333 forming the boundary between the lower channel LCH and the upper channel UCH may be dummy word lines. In this case, data may not be stored in the memory cells connected to the dummy word line. Alternatively, the number of pages corresponding to the memory cells connected to the dummy word line may be less than the number of pages corresponding to the memory cells connected to a general word line. A voltage level applied to the dummy word line may be different from a voltage level applied to a general word line, and accordingly, the influence of a nonuniform channel width between the lower channel LCH and the upper channel UCH on an operation of the memory device may be reduced.

Moreover, in A2 of FIG. 3, it is illustrated that the number of lower word lines 331 and 332 through which the lower channel LCH passes is less than the number of upper word lines 333 to 338 through which the upper channel UCH passes. However, this is merely an example, and the inventive concepts are not limited thereto. As another example, the number of lower word lines passing through the lower channel LCH may be equal to or greater than the number of upper word lines passing through the upper channel UCH. Also, the above structure and connection relationship of the channel structure CH arranged in the first cell area CELL1 may be similarly applied to the channel structure CH arranged in the second cell area CELL2.

In the bit line bonding area BLBA, a first through electrode THV1 may be provided in the first cell area CELL1, and a second through electrode THV2 may be provided in the second cell area CELL2. As illustrated in FIG. 3, the first through electrode THV1 may pass through the common source line 320 and the plurality of word lines 330. However, this is merely an example, and the first through electrode THV1 may further pass through the second substrate 310. The first through electrode THV1 may include a conductive material. Alternatively, the first through electrode THV1 may include a conductive material surrounded by an insulating material. The second through electrode THV2 may also be provided in the same shape and structure as the first through electrode THV1.

In some example embodiments, the first through electrode THV1 and the second through electrode THV2 may be electrically connected to each other through a first through metal pattern 372*d* and a second through metal pattern 472*d*. The first through metal pattern 372*d* may be formed at the upper end of the first upper chip including the first cell area CELL1, and the second through metal pattern 472*d* may be formed at the lower end of the second upper chip including the second cell area CELL2. The first through electrode THV1 may be electrically connected to the first metal line 350*c* and the second metal line 360*c*. A lower via 371*d* may be formed between the first through electrode THV1 and the first through metal pattern 372*d*, and an upper via 471*d* may be formed between the second through electrode THV2 and the second through metal pattern 472*d*. The first through metal pattern 372*d* and the second through metal pattern 472*d* may be connected by bonding.

Also, in the bit line bonding area BLBA, an upper metal pattern 252 may be formed at an uppermost metal layer of the peripheral circuit area PERI, and an upper metal pattern 392 having the same shape as the upper metal pattern 252 may be formed at an uppermost metal layer of the first cell area CELL1. The upper metal pattern 392 of the first cell area CELL1 and the upper metal pattern 252 of the peripheral circuit area PERI may be electrically connected to each other by bonding. In the bit line bonding area BLBA, the bit line 360*c* may be electrically connected to a page buffer included in the peripheral circuit area PERI. For example, some of the circuit elements 220*c* of the peripheral circuit area PERI may provide a page buffer, and the bit line 360*c* may be electrically connected to the circuit elements 220*c* providing the page buffer through an upper bonding metal 370*c* of the first cell area CELL1 and an upper bonding metal 270*c* of the peripheral circuit area PERI.

Moreover, referring to FIG. 3, in the word line bonding area WLBA, the word lines 330 of the first cell area CELL1 may extend in a second direction (X-axis direction) parallel to the upper surface of the second substrate 310 and may be connected to a plurality of cell contact plugs 340 (341 to 347). A first metal layer 350*b* and a second metal layer 360*b* may be sequentially connected to the upper portions of the cell contact plugs 340 connected to the word lines 330. The cell contact plugs 340 may be connected to the peripheral circuit area PERI through an upper bonding metal 370*b* of the first cell area CELL1 and an upper bonding metal 270*b* of the peripheral circuit area PERI in the word line bonding area WLBA.

The cell contact plugs 340 may be electrically connected to a row decoder included in the peripheral circuit area PERI. For example, some of the circuit elements 220*b* of the peripheral circuit area PERI may provide a row decoder, and the cell contact plugs 340 may be electrically connected to the circuit elements 220*b* providing the row decoder through the upper bonding metal 370*b* of the first cell area CELL1 and the upper bonding metal 270*b* of the peripheral circuit area PERI. In some example embodiments, an operation voltage of the circuit elements 220*b* providing the row decoder may be different from an operation voltage of the circuit elements 220*c* providing the page buffer. For example, the operation voltage of the circuit elements 220*c* providing the page buffer may be greater than the operation voltage of the circuit elements 220*b* providing the row decoder.

Likewise, in the word line bonding area WLBA, the word lines 430 of the second cell area CELL2 may extend in the second direction (X-axis direction) parallel to the upper surface of the third substrate 410 and may be connected to a plurality of cell contact plugs 440 (441 to 447). The cell contact plugs 440 may be connected to the peripheral circuit area PERI through the upper metal pattern of the second cell area CELL2, the lower and upper metal patterns of the first cell area CELL1, and a cell contact plug 348.

In the word line bonding area WLBA, an upper bonding metal 370*b* may be formed in the first cell area CELL1, and an upper bonding metal 270*b* may be formed in the peripheral circuit area PERI. The upper metal pattern 370*b* of the first cell area CELL1 and the upper metal pattern 270*b* of the peripheral circuit area PERI may be electrically connected to each other by bonding. The upper bonding metal 370b and the upper bonding metal 270b may be formed of aluminum, copper, tungsten, or the like.

In the external pad bonding area PA, a lower metal pattern 371e may be formed at a lower portion of the first cell area CELL1, and an upper metal pattern 472a may be formed at an upper portion of the second cell area CELL2. The lower metal pattern 371e of the first cell area CELL1 and the upper metal pattern 472a of the second cell area CELL2 may be connected to each other by bonding in the external pad bonding area PA. Likewise, an upper metal pattern 372a may be formed at an upper portion of the first cell area CELL1, and an upper metal pattern 272a may be formed at an upper portion of the peripheral circuit area PERI. The upper metal pattern 372a of the first cell area CELL1 and the upper metal pattern 272a of the peripheral circuit area PERI may be connected to each other by bonding.

Common source line contact plugs 380 and 480 may be arranged in the external pad bonding area PA. The common source line contact plugs 380 and 480 may be formed of a conductive material such as a metal, a metal compound, or doped polysilicon. The common source line contact plug 380 of the first cell area CELL1 may be electrically connected to the common source line 320, and the common source line contact plug 480 of the second cell area CELL2 may be electrically connected to the common source line 420. A first metal line 350a and a second metal line 360a may be sequentially stacked over the common source line contact plug 380 of the first cell area CELL1, and a first metal line 450a and a second metal line 460a may be sequentially stacked over the common source line contact plug 480 of the second cell area CELL2.

Input/output pads 205, 405, and 406 may be arranged in the external pad bonding area PA. Referring to FIG. 3, a lower insulating layer 201 may cover the lower surface of the first substrate 210, and a first input/output pad 205 may be formed over the lower insulating layer 201. The first input/output pad 205 may be connected through the first input/output contact plug 203 to at least one of the plurality of circuit elements 220a arranged in the peripheral circuit area PERI and may be separated from the first substrate 210 by the lower insulating layer 201. Also, a side insulating layer may be arranged between the first input/output contact plug 203 and the first substrate 210 to electrically separate the first input/output contact plug 203 from the first substrate 210.

An upper insulating layer 401 covering the upper surface of the third substrate 410 may be formed over the third substrate 410. A second input/output pad 405 and/or a third input/output pad 406 may be arranged over the upper insulating layer 401. The second input/output pad 405 may be connected through second input/output contact plugs 403 and 303 to at least one of the plurality of circuit elements 220a arranged in the peripheral circuit area PERI, and the third input/output pad 406 may be connected through third input/output contact plugs 404 and 304 to at least one of the plurality of circuit elements 220a arranged in the peripheral circuit area PERI.

In some example embodiments, the third substrate 410 may not be arranged in an area where the input/output contact plug is arranged. For example, as illustrated in B of FIG. 3, the third input/output contact plug 404 may be separated from the third substrate 410 in a direction parallel to the upper surface of the third substrate 410 and may be connected to the third input/output pad 406 through an interlayer insulating layer 415 of the second cell area CELL2. In this case, the third input/output contact plug 404 may be formed through various processes.

For example, as illustrated in B1 of FIG. 3, the third input/output contact plug 404 may extend in a third direction (Z-axis direction) and may have a diameter increasing toward the upper insulating layer 401. That is, while the diameter of the channel structure CH described in A1 of FIG. 3 may be formed to decrease toward the upper insulating layer 401, the diameter of the third input/output contact plug 404 may be formed to increase toward the upper insulating layer 401. For example, the third input/output contact plug 404 may be formed after the second cell area CELL2 and the first cell area CELL1 are bonded to each other.

Also, for example, as illustrated in B2 of FIG. 3, the third input/output contact plug 404 may extend in the third direction (Z-axis direction) and may have a diameter decreasing toward the upper insulating layer 401. That is, like the diameter of the channel structure CH, the diameter of the third input/output contact plug 404 may be formed to decrease toward the upper insulating layer 401. For example, the third input/output contact plug 404 may be formed together with the cell contact plugs 440 before the second cell area CELL2 and the first cell area CELL1 are bonded to each other.

In some example embodiments, the input/output contact plug may be arranged to overlap the third substrate 410. For example, as illustrated in C1 of FIG. 3, the second input/output contact plug 403 may be formed to pass through the interlayer insulating layer 415 of the second cell area CELL2 in the third direction (Z-axis direction) and may be electrically connected to the second input/output pad 405 through the third substrate 410. In this case, the connection structure between the second input/output contact plug 403 and the second input/output pad 405 may be implemented in various ways.

For example, as illustrated in C1 of FIG. 3, an opening 408 passing through the third substrate 410 may be formed, and the second input/output contact plug 403 may be directly connected to the second input/output pad 405 through the opening 408 formed in the third substrate 410. In this case, as illustrated in C1 of FIG. 3, the diameter of the second input/output contact plug 403 may be formed to increase toward the second input/output pad 405. However, this is merely an example, and the diameter of the second input/output contact plug 403 may be formed to decrease toward the second input/output pad 405.

For example, as illustrated in C2 of FIG. 3, an opening 408 passing through the third substrate 410 may be formed, and a contact 407 may be formed in the opening 408. One end of the contact 407 may be connected to the second input/output pad 405, and the other end may be connected to the second input/output contact plug 403. Accordingly, the second input/output contact plug 403 may be electrically connected to the second input/output pad 405 through the contact 407 in the opening 408. In this case, as illustrated in C2 of FIG. 3, the diameter of the contact 407 may be formed to increase toward the second input/output pad 405, and the diameter of the second input/output contact plug 403 may be formed to decrease toward the second input/output pad 405. For example, the third input/output contact plug 404 may be formed together with the cell contact plugs 440 before the second cell area CELL2 and the first cell area CELL1 are bonded to each other, and the contact 407 may be formed after the second cell area CELL2 and the first cell area CELL1 are bonded to each other.

Also, for example, as illustrated in C3 of FIG. 3, compared to C2 of FIG. 3, a stopper 409 may be further formed on the upper surface of the opening 408 of the third substrate 410. The stopper 409 may be a metal line formed on the same layer as the common source line 420. However, this is merely an example, and the stopper 409 may be a metal line formed on the same layer as at least one of the word lines 430. The second input/output contact plug 403 may be electrically connected to the second input/output pad 405 through the contact 407 and the stopper 409.

Moreover, similarly to the diameter of each of the second and third input/output contact plugs 403 and 404 of the second cell area CELL2, the diameter of each of the second and third input/output contact plugs 303 and 304 of the first cell area CELL1 may be formed to decrease toward the lower metal pattern 371e or to increase toward the lower metal pattern 371c.

Moreover, according to example embodiments, a slit 411 may be formed in the third substrate 410. For example, the slit 411 may be formed at a certain position of the external pad bonding area PA. For example, as illustrated in D1 of FIG. 3, the slit 411 may be located between the second input/output pad 405 and the cell contact plugs 440 in the plan view. However, this is merely an example, and the slit 411 may be formed such that the second input/output pad 405 is located between the slit 411 and the cell contact plugs 440 in the plan view.

For example, as illustrated in D1 of FIG. 3, the slit 411 may be formed to pass through the third substrate 410. The slit 411 may be used, for example, to prevent or reduce the third substrate 410 from being slightly cracked when forming the opening 408. However, this is merely an example, and the slit 411 may be formed to a depth of about or exactly 60% to about or exactly 70% of the thickness of the third substrate 410.

Also, for example, as illustrated in D2 of FIG. 3, a conductive material 412 may be formed in the slit 411. The conductive material 412 may be used, for example, to discharge a leakage current generated during the driving of the circuit elements in the external pad bonding area PA. In this case, the conductive material 412 may be connected to an external ground line.

Also, for example, as illustrated in D3 of FIG. 3, an insulating material 413 may be formed in the slit 411. The insulating material 413 may be formed, for example, to electrically separate the second input/output pad 405 and the second input/output contact plug 403 arranged in the external pad bonding area PA from the word line bonding area WLBA. By forming the insulating material 413 in the slit 411, a voltage provided through the second input/output pad 405 may be blocked from affect the metal layer arranged over the third substrate 410 in the word line bonding area WLBA.

Moreover, according to example embodiments, the first to third input/output pads 205, 405, and 406 may be selectively formed. For example, the memory device 500 may be implemented to include only the first input/output pad 205 arranged over the first substrate 210, only the second input/output pad 405 arranged over the third substrate 410, or only the third input/output pad 406 arranged over the upper insulating layer 401.

Moreover, according to example embodiments, at least one of the second substrate 310 of the first cell area CELL1 and the third substrate 410 of the second cell area CELL2 may be used as a sacrificial substrate and may be completely or partially removed before or after the bonding process. One or more additional layers may be stacked after the removing of the substrate. For example, the second substrate 310 of the first cell area CELL1 may be removed before or after the bonding of the peripheral circuit area PERI and the first cell area CELL1, and an insulating layer covering the upper surface of the common source line 320 or a conductive layer for connection may be formed. Similarly, the third substrate 410 of the second cell area CELL2 may be removed before or after the bonding of the first cell area CELL1 and the second cell area CELL2, and an upper insulating layer 401 covering the upper surface of the common source line 420 or a conductive layer for connection may be formed.

FIG. 4 is a perspective view illustrating a memory block according to some example embodiments. FIG. 4 representatively illustrates the memory block BLK1 among the plurality of memory blocks BLK1 to BLKn of FIG. 2. The memory block BLK1 may include NAND strings or cell strings formed in a 3D or vertical structure. The memory block BLK1 may include structures extending in a plurality of directions X, Y, and Z.

Referring to FIG. 4, the memory block BLK1 may be formed in a vertical direction (Z direction) with respect to a substrate SUB. The substrate SUB may have a first conductivity type (e.g., p-type), and a common source line CSL doped with dopants of a second conductivity type (e.g., n-type) may be formed at the substrate SUB.

Over an area of the substrate SUB between the common source lines CSL, a plurality of insulating layers IL extending in a second horizontal direction (Y direction) may be sequentially provided in the vertical direction (Z direction). For example, the plurality of insulating layers IL may be formed apart from each other by a certain distance in a first horizontal direction (X direction). For example, the insulating layers IL may include an insulating material such as silicon oxide.

Channel structures CH sequentially arranged in the second horizontal direction (Y direction) and passing through the insulating layers IL in the vertical direction (Z direction) may be formed over the substrate SUB between the common source lines CSL. For example, the channel structures CH may be connected to the substrate SUB by passing through the insulating layers IL. For example, each channel structure CH may include a plurality of materials. A surface layer S of the channel structure CH may include a silicon material having a first conductivity type and may function as a channel area. In some example embodiments, the channel structure CH may be referred to as a vertical channel structure or a pillar. Moreover, an inner layer I of each channel structure CH may include an insulating material such as silicon oxide and/or an air gap.

A charge storage layer CS may be provided along the insulating layers IL, the channel structure CH, and the exposed surface of the substrate SUB. The charge storage layer CS may include a gate insulating layer (or referred to as "tunneling insulating layer"), a charge trap layer, and a blocking insulating layer. For example, the charge storage layer CS may have an oxide-nitride-oxide (ONO) structure. Also, a gate electrode GE such as a ground selection line GSL, a string selection line SSL, and word lines WL1 to WL8 may be provided over the exposed surface of the charge storage layer CS.

Drain contacts or drains DR may be respectively provided over a plurality of channel structures CH. For example, the drains DR may include a silicon material doped with dopants of a second conductivity type. Bit lines BL1 to BL3 extending in the first horizontal direction (X direction) and arranged apart from each other by a certain distance in the second horizontal direction (Y direction) may be provided over the drains DR.

The memory block BLK1 may include a first memory stack STCK1 and a second memory stack STCK2 stacked in the vertical direction (Z direction). For example, the first memory stack STCK1 may include word lines WL1 to WL4, and the second memory stack STCK2 may include word lines WL5 to WL8. An inter-stack area INT-ST may be provided between the first memory stack STCK1 and the second memory stack STCK2 to secure the structural stability of the memory device 120 in the manufacturing process of the memory device 120.

Figure 5:
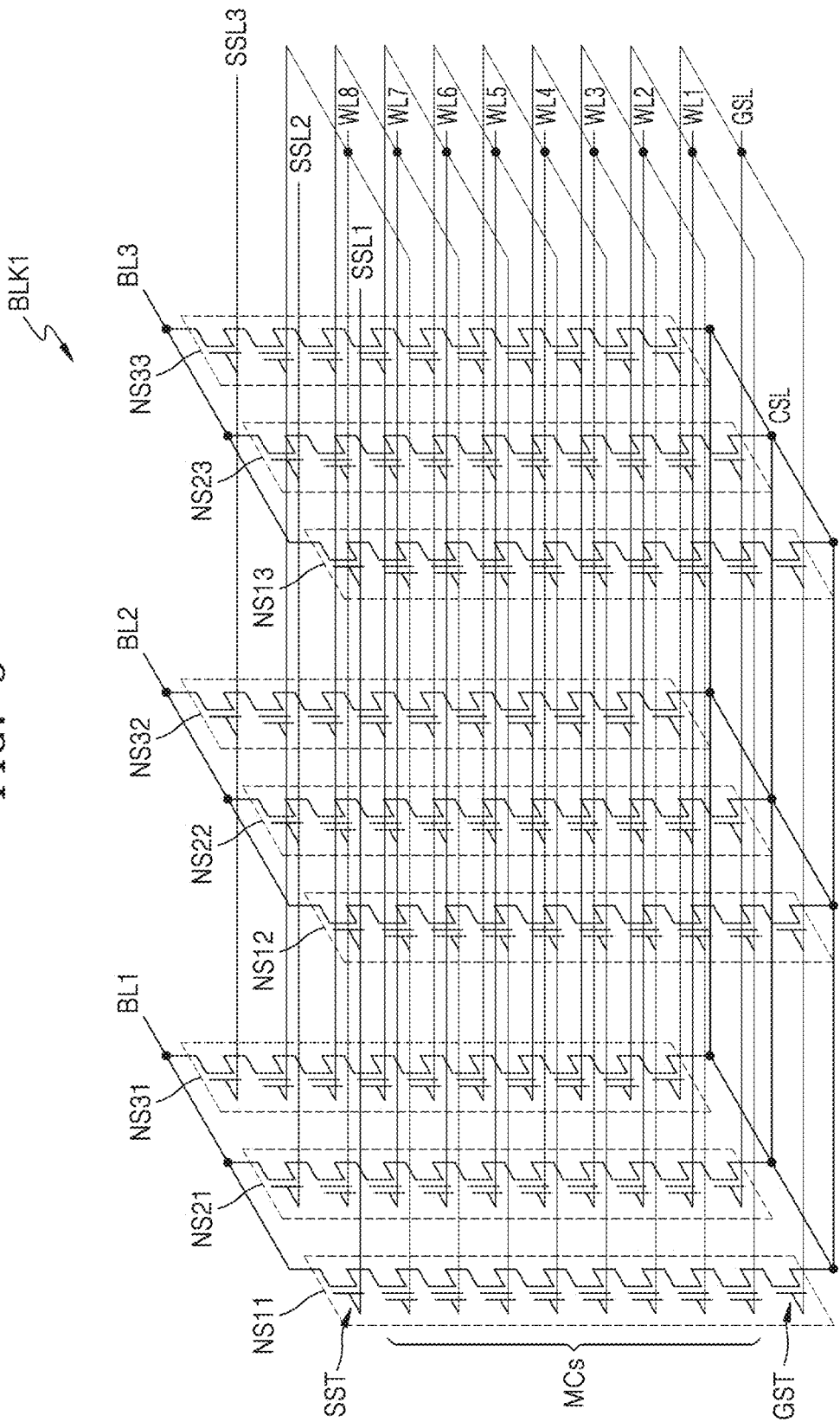
FIG. 5 is an equivalent circuit diagram of the memory block of FIG. 4.

FIG. 5 is an equivalent circuit diagram of the memory block of FIG. 4.

Referring to FIG. 5, the memory block BLK1 may include NAND strings NS11 to NS33, word lines WL1 to WL8, bit lines BL1 to BL3, a ground selection line GSL, string selection lines SSL1 to SSL3, and a common source line CSL. FIG. 5 illustrates that each of the NAND strings NS11 to NS33 includes eight memory cells MCs connected to eight word lines WL1 to WL8; however, the inventive concepts are not limited thereto. Also, FIG. 5 illustrates one ground selection line; however, the number of ground selection lines may be two or more as described below with reference to FIGS. 6, 8A, and 8B.

Each NAND string (for example, NS11) may include a string selection transistor SST, a plurality of memory cells MC, and a ground selection transistor GST that are connected in series. The string selection transistor SST may be connected to one of the corresponding string selection lines SSL1 to SSL3. The plurality of memory cells MC may be respectively connected to the corresponding word lines WL1 to WL8. The ground selection transistor GST may be connected to the corresponding ground selection line GSL. The string selection transistor SST may be connected to one of the corresponding bit lines BL1 to BL3, and the ground selection transistor GST may be connected to the common source line CSL.

According to example embodiments, in each cell string, one or more dummy memory cells may be provided between the string selection transistor SST and the memory cells MC. In each cell string, one or more dummy memory cells may be provided between the ground selection transistor GST and the memory cells MC. In each cell string, one or more dummy memory cells may be provided between the memory cells MC. The dummy memory cells may have the same structure as the memory cells MC and may be unprogrammed (for example, program-inhibited) or may be programmed differently from the memory cells MC. For example, when the memory cells MC are programmed to have two or more threshold voltage distributions, the dummy memory cells may be programmed to have one threshold voltage distribution range or to have fewer threshold voltage distributions than the memory cells MC.

Figure 6:
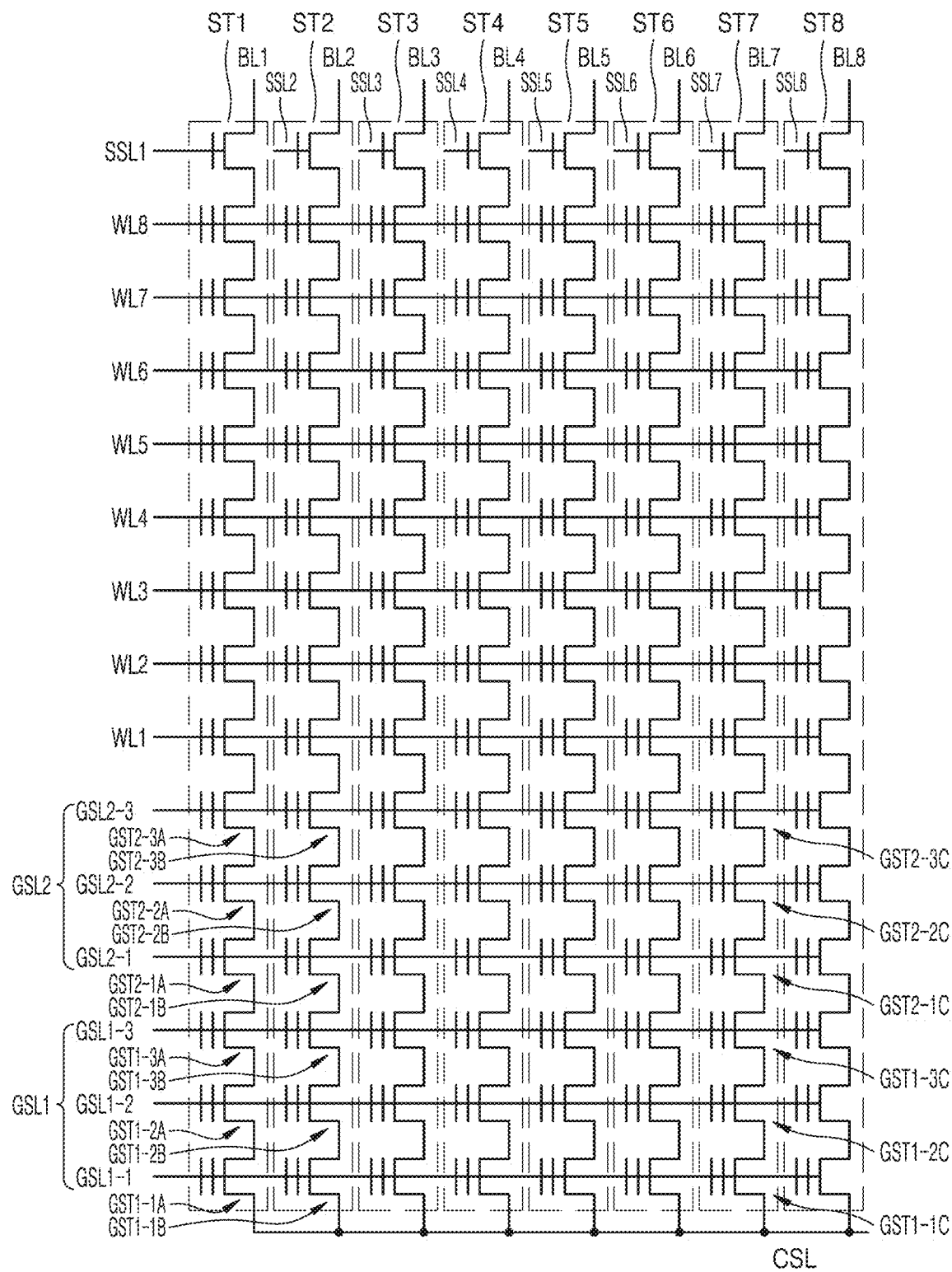
FIG. 6 is a diagram illustrating a structure of cell strings according to some example embodiments.

FIG. 6 is a diagram illustrating a structure of a memory block according to some example embodiments.

Referring to FIG. 6, a memory cell array may include a plurality of cell strings ST1 to ST8.

Each of the cell strings may be connected to first to eighth word lines WL1 to WL8, a first ground selection line GSL1, and a second ground selection line GSL2. Also, the cell strings ST1 to ST8 may be respectively connected to first to eighth string selection lines SSL1 to SSL8 and first to eighth bit lines BL1 to BL8.

The structure of ground selection lines illustrated in FIG. 6 may be referred to as a coded ground selection line (GSL) structure. The coded GSL structure may refer to a structure in which the connection between a channel and a common source line CSL is controlled by using two or more ground selection lines GSL1 and GSL2 connected to transistors having different threshold voltage distributions. The first ground selection line GSL1 and the second ground selection line GSL2 may be connected to transistors having different threshold voltage distributions.

Also, in the coded GSL structure, the connection between the channel and the common source line may be stably controlled by grouping two or more ground selection lines. For example, the first ground selection line GSL1 may operate as one ground selection line by grouping (1-1)th to (1-3)th ground selection lines GSL1-1 to GSL1-3. In this case, each of the (1-1)th to ((1-3)th ground selection lines GSL1-1 to GSL1-3 may be referred to as a sub ground selection line of the first ground selection line GSL1. The same voltage may be applied to sub ground selection lines GSL1-1 to GSL1-3 and GSL2-1 to GSL2-3. However, the sub ground selections may have different process characteristics. For example, the sub ground selection lines GSL1-1 to GSL1-3 and GSL2-1 to GSL2-3 may be different from each other in terms of process characteristics such as a diameter of a channel connected to each sub ground selection line, a word line thickness, an inter-wordline distance, and/or a wordline-to-channel distance. The time required for the pre pulse recovery operation may vary depending on the process characteristics of each of the sub ground selection lines GSL1-1 to GSL1-3 and GSL2-1 to GSL2-3. For example, the time required for the pre pulse recovery operation may increase when the channel diameter is short, when the word line thickness is great, when the inter-wordline distance is short, or when the wordline-to-channel distance is long.

The ground selection lines GSL1 and GSL2 may be connected to ground selection transistors having different threshold voltage distributions. For example, the first ground selection line GSL1 may include transistors having a first threshold voltage distribution and transistors having a second threshold voltage distribution. Likewise, the second ground selection line GSL2 may include transistors having a first threshold voltage distribution and transistors having a second threshold voltage distribution.

The sub ground selection lines GSL1-1 to GSL1-3 and GSL2-1 to GSL2-3 included in the ground selection lines GSL1 and GSL2 may have the same threshold voltage distribution for each cell string. For example, the (1-1)th to (1-3)th ground selection lines GSL1-1 to GSL1-3 included in the first ground selection line GSL1 may have the same or substantially the same threshold voltage distribution for each cell string. For example, a (1-1A)th ground selection transistor GST1-1A, a (1-2A)th ground selection transistor GST1-2A, and a (1-3A)th ground selection transistor GST1-3A included in the first cell string ST1 and a (1-1B)th ground selection transistor GST1-1B, a (1-2B)th ground selection transistor GST1-2B, and a (1-3B)th ground selection transistor GST1-3B included in the second cell string ST2 may have a first threshold voltage distribution. On the other hand, a (1-1C)th ground selection transistors GST1-1C, a (1-2C)th ground selection transistors GST1-2C, and a (1-3C)th ground selection transistor GST1-3C included in the seventh cell string ST7 may have a second threshold voltage distribution.

The cell strings connected to the common source line CSL may vary depending on the voltages applied to the ground selection transistors having different threshold voltages. For example, a first threshold voltage may be about or exactly 0

V and a second threshold voltage may be about or exactly 3 V. When the first ground selection line GSL1 is selected, a voltage of about or exactly 2 V may be applied to the first ground selection line GSL1 and a voltage of about or exactly 6 V capable of turning on all of the ground selection transistors connected to the second ground selection line GSL2 may be applied to the second ground selection line GSL2.

Among the transistors connected to the first ground selection line GSL1, transistors having the first threshold voltage may be turned on, but transistors having the second threshold voltage may be turned off. Thus, the first cell string ST1 and the second cell string ST2 may be connected to the common source line CSL, but the seventh cell string ST7 may not be connected to the common source line CSL.

As described above, the cell strings connected to the common source line CSL may vary depending on the voltages applied to the ground selection transistors having two or more threshold voltages. Thus, the connection between the channel and the common source line CSL may be controlled by adjusting the voltage applied to the ground selection lines GSL1 and GSL2.

Figure 7:
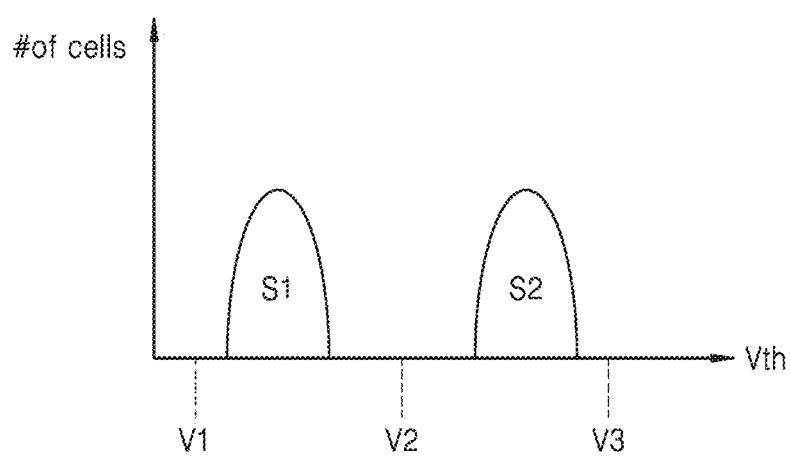
FIG. 7 is a diagram illustrating a threshold voltage of ground selection transistors according to some example embodiments.

FIG. 7 is a diagram illustrating a threshold voltage of ground selection transistors according to some example embodiments. FIG. 7 may be described with reference to FIGS. 1 and 6.

Referring to FIG. 7, the ground selection transistors may have a first threshold voltage distribution S1 or a second threshold voltage distribution S2. The first threshold voltage distribution S1 may refer to a threshold voltage distribution higher than or equal to a first voltage level V1 and lower than a second voltage level V2, and the second threshold voltage distribution S2 may refer to a threshold voltage distribution higher than or equal to the second voltage level V2 and lower than a third voltage level V3. For example, when a voltage of the second voltage level V2 is applied to a transistor having the first threshold voltage distribution S1, the transistor having the first threshold voltage distribution S1 may be turned on. On the other hand, when a voltage of the second voltage level V2 is applied to a transistor having the second threshold voltage distribution S2, the transistor having the second threshold voltage distribution S2 may be turned off.

The control circuit 124 may control the transistors connected to the ground selection lines GSL1 and GSL2, by controlling the nonvolatile memory such that a voltage of any one of the first voltage level V1, the second voltage level V2, and the third voltage level V3 is applied to the ground selection lines GSL1 and GSL2. For example, the first voltage level V1 may be about or exactly 0 V, the second voltage level V2 may be about or exactly 2 V, and the third voltage level V3 may be about or exactly 6 V. In this case, when a voltage of 2 V is applied to the ground selection line connected to the ground selection transistors, the transistors having the first threshold voltage distribution S1 may be turned on but the transistors having the second threshold voltage distribution S2 may be turned off.

Figure 8A:
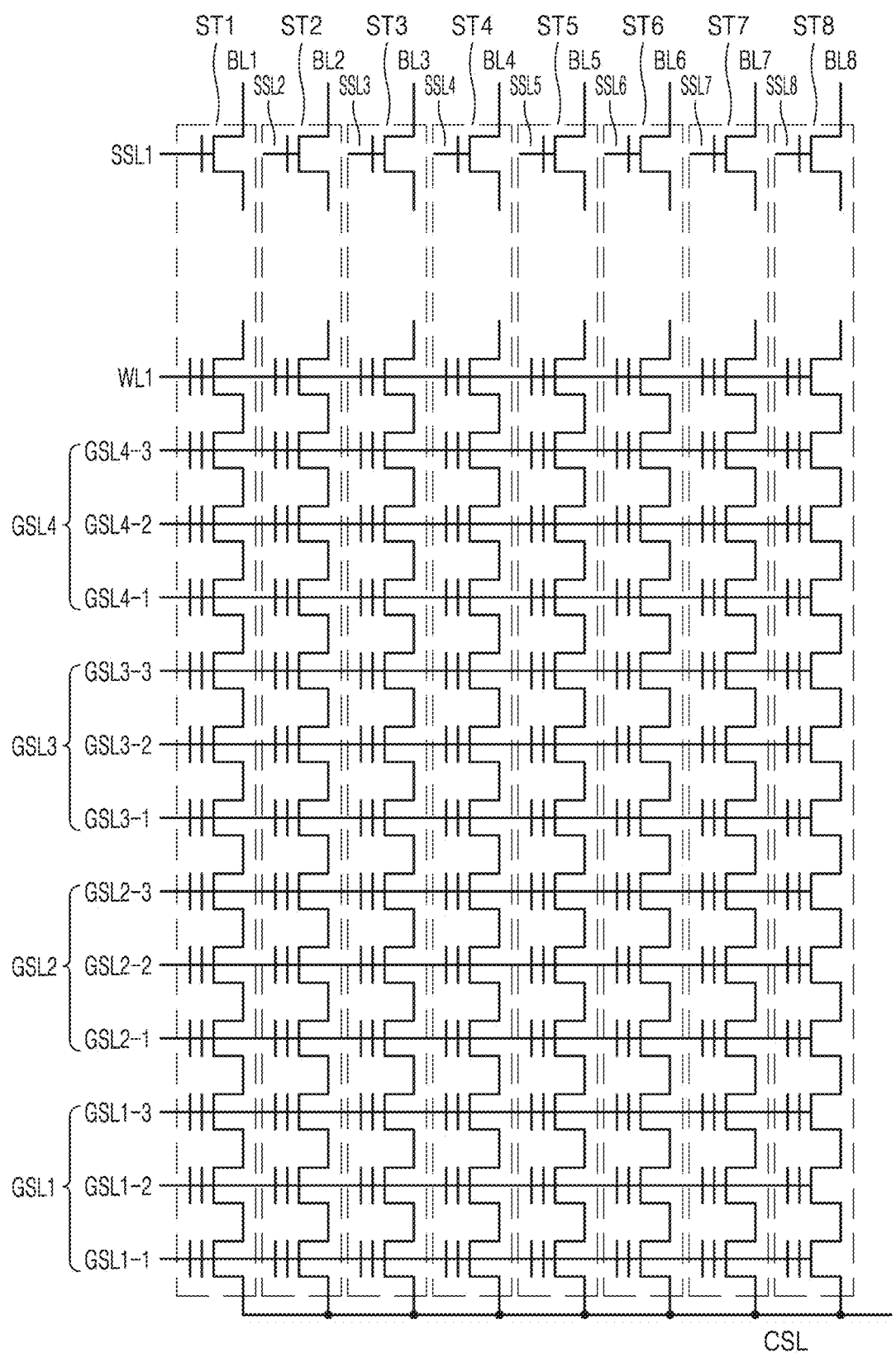
FIGS. 8A and 8B are diagrams illustrating a structure of cell strings according to some example embodiments.
Figure 8B:
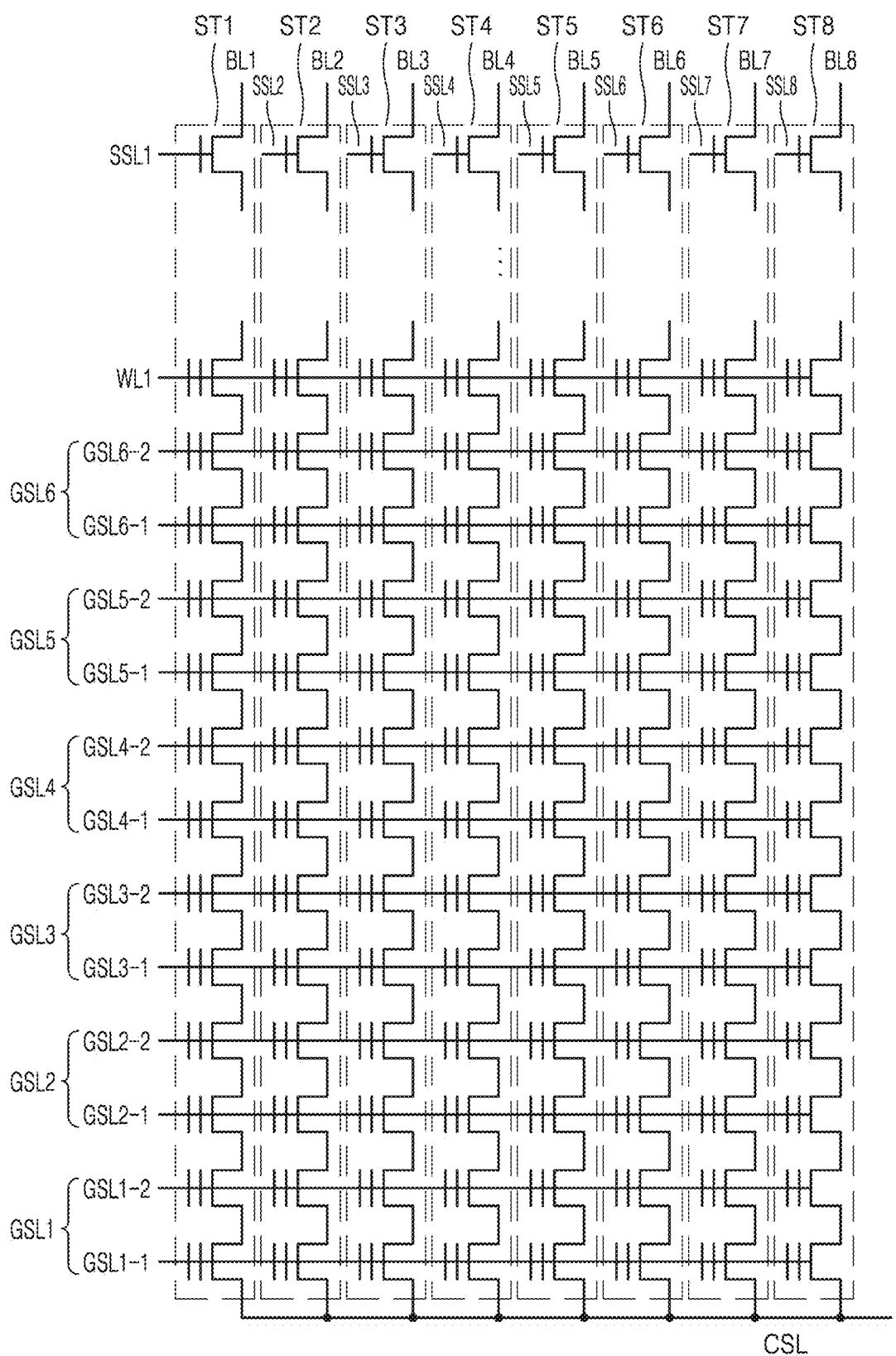

FIGS. 8A and 8B are diagrams illustrating a structure of cell strings according to some example embodiments.

FIG. 8A illustrates a case where three sub ground selection lines are grouped, and FIG. 8B illustrates a case where two sub ground selection lines are grouped.

Referring to FIG. 8A, each of a plurality of cell strings ST1 to ST8 may be connected to first to eighth bit lines BL1 to BL8 and first to eighth string selection lines SSL1 to SSL8. Also, the plurality of cell strings ST1 to ST8 may be connected to first to eighth word lines WL1 to WL8 and first to fourth ground selection lines GSL1 to GSL4. Sub ground selection lines GSL1-1, GSL1-2 . . . , GSL4-3 included in the ground selection lines GSL1 to GSL4 may be connected to transistors having the same threshold voltage distribution (e.g., the first threshold voltage distribution S1 or the second threshold voltage distribution S2 of FIG. 7) for each cell string. For example, among the transistors included in the first cell string ST1, transistors connected to (1-1)th to (1-3)th ground selection lines GSL1-1 to GSL1-3 may have the same threshold voltage distribution.

Referring to FIG. 8B, a plurality of cell strings ST1 to ST8 may be connected to first to sixth ground selection lines GSL1 to GSL6. Also, sub ground selection lines GSL1-1, GSL1-2 . . . , GSL6-2 included in the ground selection line may have the same threshold voltage distribution for each cell string.

Figure 9:
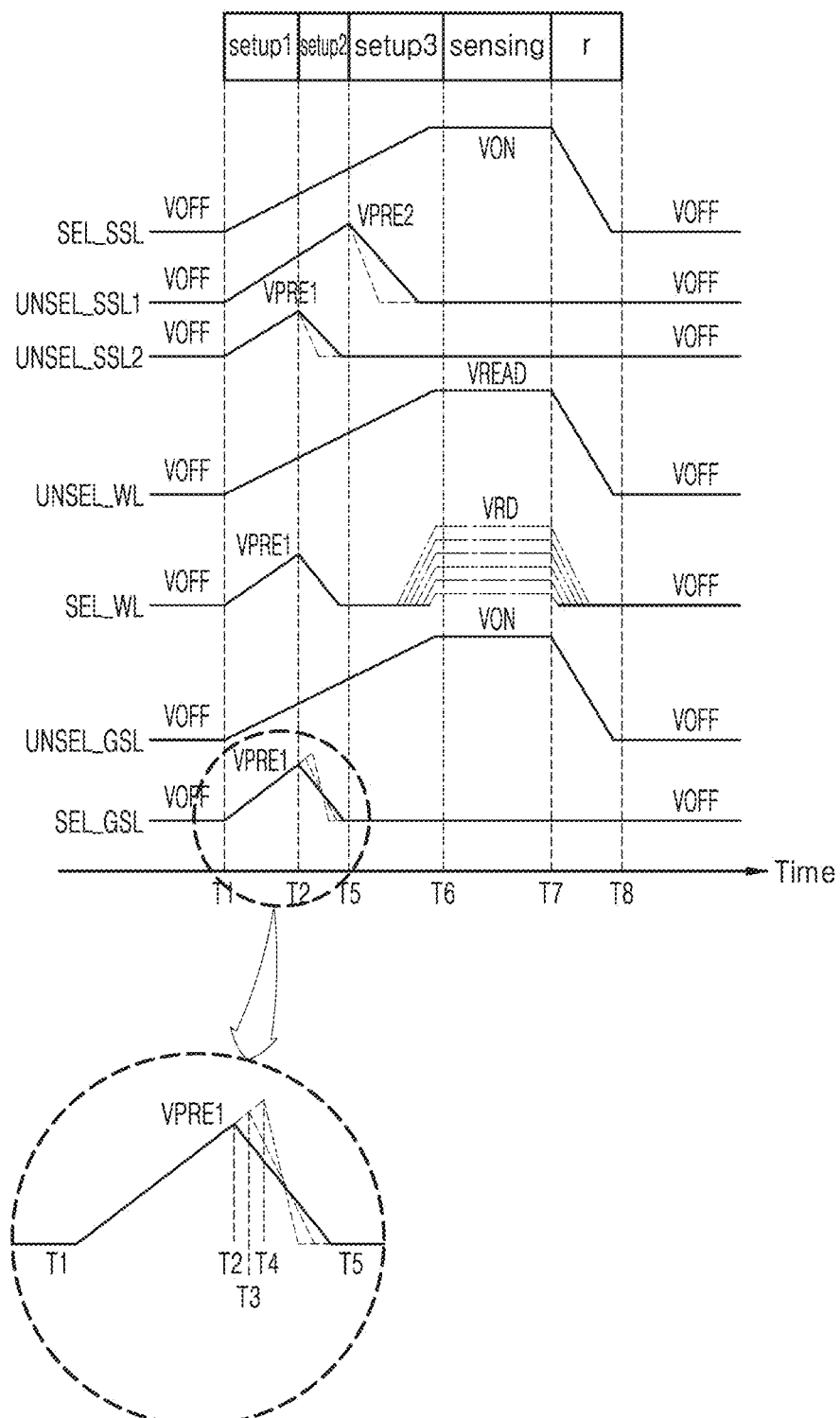
FIG. 9 is a diagram illustrating a voltage level of a cell string according to some example embodiments.

FIG. 9 is a diagram illustrating a voltage level applied to a cell string according to some example embodiments. FIG. 9 may be described with reference to FIG. 6.

FIG. 9 illustrates examples of voltages applied to the cell strings ST1 to ST8 of FIG. 6 in a read operation. Referring to FIG. 6, the fourth word line WL4, the first string selection line SSL1, and the first ground selection line GSL1 may be selected. That is, the memory cells commonly corresponding to the fourth word line WL4, the first string selection line SSL1, and the first ground selection line GSL1 may be selected as a target for a read operation.

A selected string selection line SEL_SSL may refer to a string selection line connected to a cell string including a cell transistor to be programmed or read, among a plurality of string selection lines SSL1 to SSL8. For example, the selected string selection line SEL_SSL may include the first string selection line SSL1. Unselected string selection lines may refer to the remaining string selection lines or the other string selection lines other than the selected string selection line among the plurality of string selection lines SSL1 to SSL8. The unselected string selection lines may include the second to eighth string selection lines SSL2 to SSL8.

A selected word line SEL_WL may refer to a word line connected to a cell transistor to be programmed or read, among a plurality of word lines WL1 to WL8. For example, the selected word line SEL_WL may include the fourth word line WL4. Unselected word lines UNSEL_WL may refer to the remaining word lines or the other word lines other than the selected word line among the plurality of word lines. For example, the unselected word lines UNSEL_WL may include the first to third word lines WL1 to WL3 and the fifth to eighth word lines WL5 to WL8.

A selected ground selection line SEL_GSL may refer to a ground selection line connected to ground selection transistors having the first threshold voltage distribution among the ground selection transistors included in the selected cell string. For example, the selected ground selection line SEL_GSL may include the first ground selection line GSL1 connected to ground selection transistors having the first threshold voltage distribution among the ground selection transistors included in the first cell string ST1. Unselected ground selection lines UNSEL_GSL may refer to the remaining ground selection lines or the other ground selection lines other than the selected ground selection line among the plurality of ground selection lines GSL1 and GSL2. For example, the unselected ground selection lines UNSEL_GSL may include the second ground selection line GSL2.

A first unselected string selection line UNSEL_SSL1 may refer to a string selection line connected to the cell string having the same threshold voltage distribution of ground selection transistors as the selected cell string among the unselected string selection lines. For example, the first unselected string selection line UNSEL_SSL1 may include the second string selection line SSL2 connected to the second cell string ST2 having the same threshold voltage distribution of ground selection transistors as the first cell string ST1.

A second unselected string selection line UNSEL_SSL2 may refer to a string selection line connected to the cell string having a different threshold voltage distribution of ground selection transistors than the selected cell string among the unselected string selection lines. For example, the second unselected string selection line UNSEL_SSL2 may include the seventh string selection line SSL7.

The voltage of the selected string selection line SEL_SSL may increase from an off voltage VOFF to an on voltage VON from a first time T1 to a sixth time T6 (for example, during a setup period setup or setup1 to setup3). The voltage of the selected string selection line SEL_SSL may maintain the on voltage VON from the sixth time T6 to a seventh time T7 (for example, during a sensing period "sensing"). The voltage of the selected string selection line SEL_SSL may decrease from the on voltage VON to the off voltage VOFF from the seventh time T7 to an eighth time T8 (for example, during a recovery period "r").

The voltage of the first unselected string selection line UNSEL_SSL1 may increase from the off voltage VOFF to a second pre pulse voltage VPRE2 from the first time T1 to a fifth time T5. The voltage of the first unselected string selection line UNSEL_SSL1 may decrease from the second pre pulse voltage VPRE2 to the off voltage VOFF after the fifth time T5. In this case, the time required for a pre pulse recovery operation may be reduced by applying a negative voltage lower than the ground voltage to the first unselected string selection line UNSEL_SSL1 having the first process characteristic resistant to hot carrier injection. Thereafter, the voltage of the first unselected string selection line UNSEL_SSL1 may maintain the off voltage VOFF.

The voltage of the second unselected string selection line UNSEL_SSL2 may increase from the off voltage VOFF to a first pre pulse voltage VPRE1 from the first time T1 to a second time T2. After the second time T2, the voltage of the second unselected string selection line UNSEL_SSL2 may decrease from the first pre pulse voltage VPRE1 to the off voltage VOFF. In this case, the time required for a pre pulse recovery operation may be reduced by applying a negative voltage lower than the ground voltage to the second unselected string selection line UNSEL_SSL2 having the first process characteristic resistant to hot carrier injection. Thereafter, the voltage of the second unselected string selection line UNSEL_SSL2 may maintain the off voltage VOFF.

The voltage of the unselected word line UNSEL_WL may increase from the off voltage VOFF to a read pass voltage VREAD from the first time T1 to the sixth time T6. The voltage of the unselected word line UNSEL_WL may maintain the read pass voltage VREAD from the sixth time T6 to the seventh time T7. Thereafter, the voltage of the unselected word line UNSEL_WL may decrease from the read pass voltage VREAD to the off voltage VOFF from the seventh time T7 to the eighth time T8.

The voltage of the selected word line SEL_WL may increase from the off voltage VOFF to the first pre pulse voltage VPRE1 from the first time T1 to the second time T2. After the second time T2, the voltage of the selected word line SEL_WL may decrease from the first pre pulse voltage VPRE1 to the off voltage VOFF. Thereafter, the voltage of the selected word line SEL_WL may increase from the off voltage VOFF to a read voltage VRD. The voltage of the selected word line SEL_WL may maintain the read voltage VRD from the sixth time T6 to the seventh time T7. The voltage of the selected word line SEL_WL may decrease from the read voltage VRD to the off voltage VOFF from the seventh time T7 to the eighth time T8.

The voltage of the unselected ground selection line UNSEL_GSL may increase from the off voltage VOFF to the on voltage VON from the first time T1 to the sixth time T6. The voltage of the unselected ground selection line UNSEL_GSL may maintain the on voltage VON from the sixth time T6 to the seventh time T7. The voltage of the unselected ground selection line UNSEL_GSL may decrease from the on voltage VON to the off voltage VOFF from the seventh time T7 to the eighth time T8.

The voltage of the selected ground selection line SEL_GSL may increase from the off voltage VOFF to the first pre pulse voltage VPRE1 from the first time T1 to the second time T2. After the second time T2, the voltage of the selected ground selection line SEL_GSL may decrease from the first pre pulse voltage VPRE1 to the off voltage VOFF. Thereafter, the voltage of the selected ground selection line SEL_GSL may maintain the off voltage VOFF.

The off voltage VOFF may turn off the transistors respectively connected to the lines. The levels of the off voltage VOFF of the respective lines may be equal to or different from each other. For example, the level of the off voltage VOFF of the first unselected string selection line UNSEL_SSL1 and the level of the off voltage VOFF of the second unselected string selection line UNSEL_SSL2 may be different from each other. The level of the off voltage VOFF of the string selection transistor SST adjacent to the first bit line BL1 and the level of the off voltage VOFF of the string selection transistor SST adjacent to the eighth memory cell MC8 may be different from each other.

In some example embodiments, the off voltage of the selected ground selection line SEL_GSL may refer to the second voltage level V2 of FIG. 7. In other words, when the selected ground selection line has an off voltage of the second voltage level V2, the transistors having the first threshold voltage distribution may be turned on but the transistors having the second threshold voltage distribution may be turned off.

The on voltage VON may turn on the transistors respectively connected to the lines. The levels of the on voltage VON of the lines may be equal to or different from each other. For example, the level of the on voltage VON of the unselected string selection line UNSEL_SSL and the level of the on voltage VON of the unselected ground selection line UNSEL_GSL may be different from each other. The level of the on voltage VON of the string selection transistor SST adjacent to the first bit line BL1 and the level of the on voltage VON of the string selection transistor SST adjacent to the eighth memory cell MC8 may be different from each other.

The read pass voltage VREAD may be a high voltage higher than the threshold voltages of the memory cells MCI to MC8. The levels of the read pass voltage VREAD of the unselected word lines UNSEL_WL may be equal to or different from each other. For example, the level of the read pass voltage VREAD of the first word line WL1 and the level of the read pass voltage VREAD of the eighth word line WL8 may be different from each other. As indicated by a dotted line, the read voltage VRD may have one of various levels depending on the target to be read.

The first and second pre pulse voltages VPRE1 and VPRE2 may turn on the string selection transistors SST, the memory cells, and the ground selection transistors GST. The first and second pre pulse voltages VPRE1 and VPRE2 may be lower than the read pass voltage VREAD. The levels of the first and second pre pulse voltages VPRE1 and VPRE2 may vary depending on the positions and types of the string selection transistors SST, the memory cells, and the ground selection transistors GST.

A pre pulse period may refer to a period in which the voltage of each of the lines increases from the off voltage VOFF to the first or second pre pulse voltage VPRE1 or VPRE2. For example, the pre pulse period of the first unselected string selection line UNSEL_SSL1 may refer to the period from the first time T1 to the fifth time T5. The pre pulse period of the second unselected string selection line UNSEL_SSL2 and the selected word line SEL_WL may refer to the period from the first time T1 to the second time T2. The pre pulse period of the selected ground selection line SEL_GSL may be any one of the period from the first time T1 to the second time T2, the period from the first time T1 to a third time T3, and the period from the first time T1 to a fourth time T4 depending on the process characteristics of the ground selection line.

A pre pulse recovery period may refer to a period in which the voltage of each of the lines decreases from the pre pulse voltage to the off voltage. For example, the pre pulse recovery period of the first unselected string selection line UNSEL_SSL1 may refer to the period from the fifth time T5 to the time at which the voltage decreases to the off voltage. The pre pulse recovery period of the second unselected string selection line UNSEL_SSL2 and the selected word line SEL_WL may refer to the period from the second time T2 to the time at which the voltage thereof decreases to the off voltage.

The pre pulse recovery period of the selected ground selection line SEL_GSL may vary depending on the voltages and process characteristics of the adjacent ground selection line. For example, the pre pulse recovery period of the ground selection transistor adjacent to one of the unselected ground selection lines and having the first process characteristic may be the period from the third time T3 to the time at which the voltage thereof decreases to the off voltage. Also, the pre pulse recovery period of the ground selection transistor adjacent to one of the unselected ground selection lines and having the second process characteristic may be the period from the second time T2 to the time at which the voltage thereof decreases to the off voltage. The pre pulse recovery period of the ground selection transistor not adjacent to the unselected ground selection lines may be the period from the fourth time T4 to the time at which the voltage thereof decreases to the off voltage.

For example, in FIG. 6, when the first ground selection line GSL1 is the selected ground selection line and the second ground selection line GSL2 is the unselected ground selection line, the (1-3)th ground selection lines GSL1-3 may be adjacent to the unselected ground selection line GSL2-1 and may have the first process characteristic. In this case, the pre pulse recovery period of the (1-3)th ground selection line GSL1-3 may be the period from the third time T3 to the time at which the voltage thereof decreases to the off voltage. Also, the (1-2)th ground selection line GSL1-2 may be adjacent to the selected ground selection lines GSL1-1 and GSL1-3. In this case, the pre pulse recovery period of the (1-2)th ground selection line GSL1-2 may be the period from the fourth time T4 to the time at which the voltage thereof decreases to the off voltage.

The read operation may include a setup period "setup", a sensing period "sensing", and a recovery period "r". The setup period "setup" may refer to a period in which the voltage of the unselected word line UNSEL_WL increases from the off voltage VOFF to the read pass voltage VREAD. The sensing period "sensing" may refer to a period in which the voltage of the unselected word line UNSEL_WL is maintained at the read pass voltage VREAD. The recovery period "r" may refer to a period in which the voltage of the unselected word line UNSEL_WL decreases from the read pass voltage VREAD to the off voltage VOFF.

The setup period "setup" may include first to third setup periods setup1 to setup3. The first setup period setup1 may refer to a period in which the voltage of, the second unselected string selection line UNSEL_SSL2, and the selected ground selection line SEL_GSL increases to the pre pulse voltage. For example, the first setup period setup1 may refer to the period from the first time T1 to the second time T2.

The second setup period setup2 may refer to a period in which the voltage of the first unselected string selection line UNSEL_SSL1 increases to the pre pulse voltage. For example, the second setup period setup2 may refer to the period from the second time T2 to the fifth time T5. The third setup period setup3 may refer to a period in which the voltage of the first unselected string selection line UNSEL_SSL1 decreases to the off voltage. For example, the third setup period setup3 may refer to the period from the fifth time T5 to the sixth time T6.

The control circuit 124 may control the nonvolatile memory such that each of the voltages of the unselected string selection lines UNSEL_SSL1 and UNSEL_SSL2, the selected ground selection line SEL_GSL, and the selected word line SEL_WL increases to the pre pulse voltage and then decreases to the off voltage VOFF.

Figure 10A:
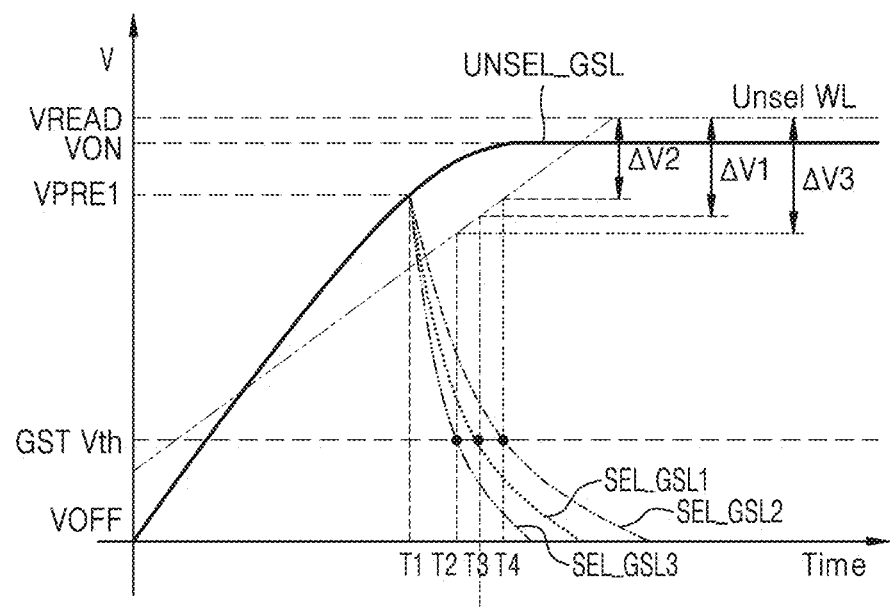
FIGS. 10A and 10B are diagrams for describing a pre pulse recovery operation according to some example embodiments.
Figure 10B:
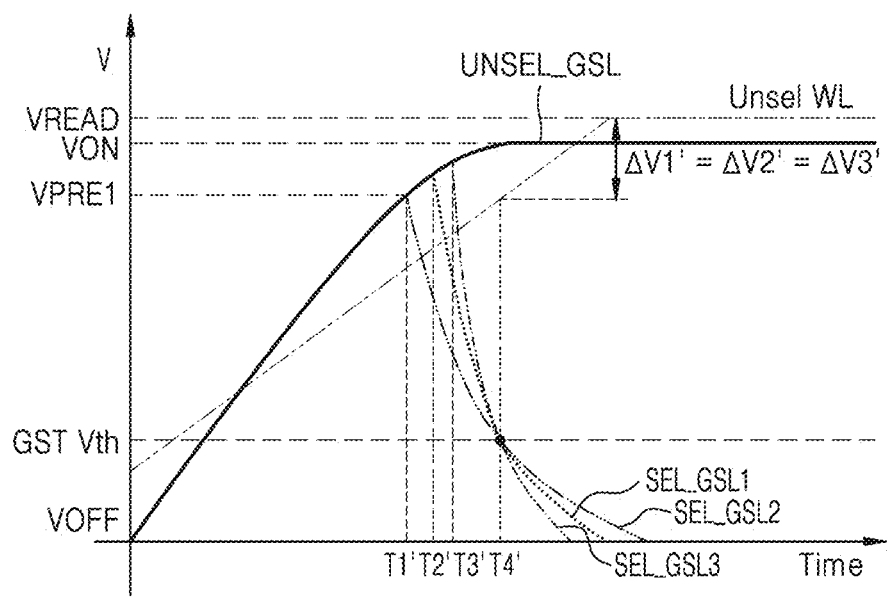

FIGS. 10A and 10B are diagrams for describing a pre pulse recovery operation according to some example embodiments.

FIG. 10A may represent a state before the pre pulse recovery timing is adjusted, and FIG. 10B may represent a state after the pre pulse recovery timing is adjusted. Referring to FIG. 10A, voltages applied to selected ground selection lines SEL_GSL1, SEL_GSL2, and SEL_GSL3, an unselected ground selection line UNSEL_GSL, and an unselected word line UNSEL_WL are illustrated.

The voltage of the unselected ground selection line UNSEL_GSL may increase from the off voltage VOFF to the on voltage VON during the setup period. The voltage of the selected ground selection lines SEL_GSL1, SEL_GSL2, and SEL_GSL3 may increase to the first pre pulse voltage VPRE1 until the first time T1.

The first selected ground selection line SEL_GSL1 may refer to a ground selection line that is adjacent to the unselected ground selection line UNSEL_GSL and has the first process characteristic. The second selected ground selection line SEL_GSL2 may refer to a ground selection line that is adjacent to the unselected ground selection line UNSEL_GSL and has the second process characteristic. The third selected ground selection line SEL_GSL3 may refer to a ground selection line that is adjacent to the selected ground selection lines SEL_GSL1 and SEL_GSL2.

The time required for the pre pulse recovery of the selected ground selection lines SEL_GSL1, SEL_GSL2, and SEL_GSL3 may vary depending on the adjacent ground selection lines, the process characteristics, and/or the like. For example, when a voltage different from the voltage of the selected ground selection line is applied to the selected ground selection line and the adjacent ground selection lines, the capacitance between the adjacent ground selection lines may increase due to the voltage difference between the adjacent ground selection lines. Thus, in this case, the time required for the pre pulse recovery may be relatively long. On the other hand, when the same voltage as the voltage of the selected ground selection line is applied to the selected ground selection line and the adjacent ground selection lines, the time required for the pre pulse recovery may be relatively short. In other words, the time required for the pre pulse recovery of the third selected ground selection line SEL_GSL3 may be shorter than the time required for the pre pulse recovery of the first selected ground selection line SEL_GSL1 or the second selected ground selection line SEL_GSL2.

Also, the first process characteristic may refer to a characteristic resistant to hot carrier injection, compared to the second process characteristic. For example, the first process characteristic may refer to a case where a channel diameter is short, a case where a word line thickness is small, a case where an inter-wordline distance is long, and/or a case where a wordline-to-channel distance is short, compared to the second process characteristic. In the case of the characteristic resistant to hot carrier injection, the time required for the pre pulse recovery may be relatively short. In other words, the time required for the pre pulse recovery of the first selected ground selection line SEL_GSL1 having the first process characteristic may be shorter than the time required for the pre pulse recovery of the second selected ground selection line SEL_GSL2 having the second process characteristic.

The voltage of the first selected ground selection line SEL_GSL1 may decrease after the first time T1 and decrease to a threshold voltage GST Vth of the ground selection transistor at the third time T3 and may decrease to the off voltage after the third time T3.

The voltage of the second selected ground selection line SEL_GSL2 may decrease after the first time T1 and decrease to the threshold voltage GST Vth of the ground selection transistor at the fourth time T4 and may decrease to the off voltage after the fourth time T4.

The voltage of the third selected ground selection line SEL_GSL3 may decrease after the first time T1 and decrease to the threshold voltage GST Vth of the ground selection transistor at the second time T2 and may decrease to the off voltage after the second time T2.

The voltage of the unselected word line UNSEL_WL may increase to the read pass voltage VREAD.

When the ground selection transistor connected to the selected ground selection line is turned off, the connection between the cell string and the common source line may be disconnected. When the connection between the cell string and the common source line is disconnected, channel boosting may occur and thus hot carrier injection may occur. Here, when the ground selection transistor is turned off, as the difference (AV1, AV2, AV3) between the voltage of the unselected word line UNSEL WL and the read pass voltage VREAD increases, the degree of channel boosting may increase and thus hot carrier injection may increase. Thus, in the case of the third selected ground selection line SEL_GSL3 among the first to third selected ground selection lines SEL_GSL1 to SEL_GSL3, hot carrier injection may occur most.

Referring to FIG. 10B, a case where the pre pulse recovery timings of the first selected ground selection line SEL_GSL1, the second selected ground selection line SEL_GSL2, and the third selected ground selection line SEL_GSL3 are adjusted is illustrated.

The voltage of the first selected ground selection line SEL_GSL1 may decrease after a second time T2' and decrease to the threshold voltage GST Vth of the ground selection transistor at a fourth time T4' and may decrease to the off voltage after the fourth time T4'.

The voltage of the second selected ground selection line SEL_GSL2 may decrease after a first time T1' and decrease to the threshold voltage GST Vth of the ground selection transistor at the fourth time T4' and may decrease to the off voltage after the fourth time T4'.

The voltage of the third selected ground selection line SEL_GSL3 may decrease after a third time T3' and decrease to the threshold voltage GST Vth of the ground selection transistor at the fourth time T4' and may decrease to the off voltage after the fourth time T4'.

Compared to the case of FIG. 10A, the time at which the ground selection transistor connected to the first selected ground selection line SEL_GSL1 and the third selected ground selection line SEL_GSL3 is turned off may be the same as the time at which the ground selection transistor connected to the second selected ground selection line SEL_GSL2 is turned off. Thus, when the ground selection transistor connected to the first selected ground selection line SEL_GSL1 and the third selected ground selection line SEL_GSL3 is turned off, the difference (AV1', AV3') between the voltage of the unselected word line UNSEL WL and the read pass voltage may decrease to the same or substantially the same level (AV2') as that of the second selected ground selection line SEL_GSL2 and thus hot carrier injection may decrease.

Figure 11:
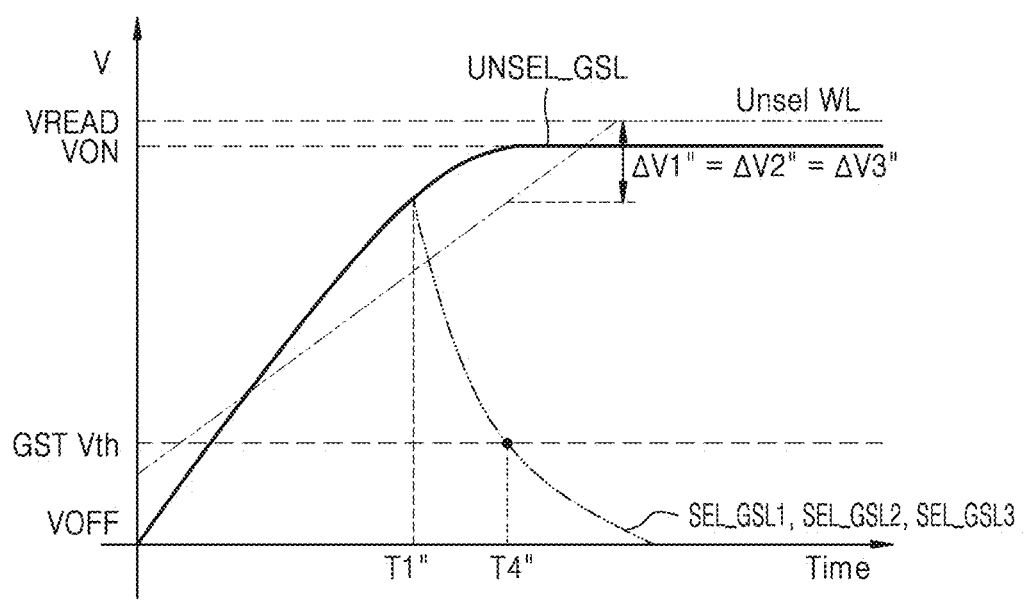
FIG. 11 is a diagram for describing a pre pulse recovery operation according to some example embodiments.

FIG. 11 is a diagram for describing a pre pulse recovery operation according to some example embodiments. FIG. 11 may be described with reference to FIGS. 1 and 10A. Referring to FIG. 11, until a first time T1", the pre pulse recovery manager 124-1 may increase the voltage of the plurality of selected ground selection lines SEL_GSL1, SEL_GSL2, and SEL_GSL3 to the pre pulse voltage by applying the first voltage to a plurality of selected ground selection lines SEL_GSL1, SEL_GSL2, and SEL_GSL3. After the first time T1", the pre pulse recovery manager 124-1 may decrease the voltage thereof to the off voltage VOFF by equally controlling the voltage gradients of the selected ground selection lines SEL_GSL1, SEL_GSL2, and SEL_GSL3.

Compared to the case of FIG. 10A, when the ground selection transistor connected to the first selected ground selection line SEL_GSL1 and the third selected ground selection line SEL_GSL3 is turned off, the difference (AV1", AV3") between the voltage of the unselected word line UNSEL WL and the read pass voltage VREAD may decrease to the same or substantially the same level (AV2") as that of the second selected ground selection line SEL_GSL2 and thus hot carrier injection may decrease.

Figure 12:
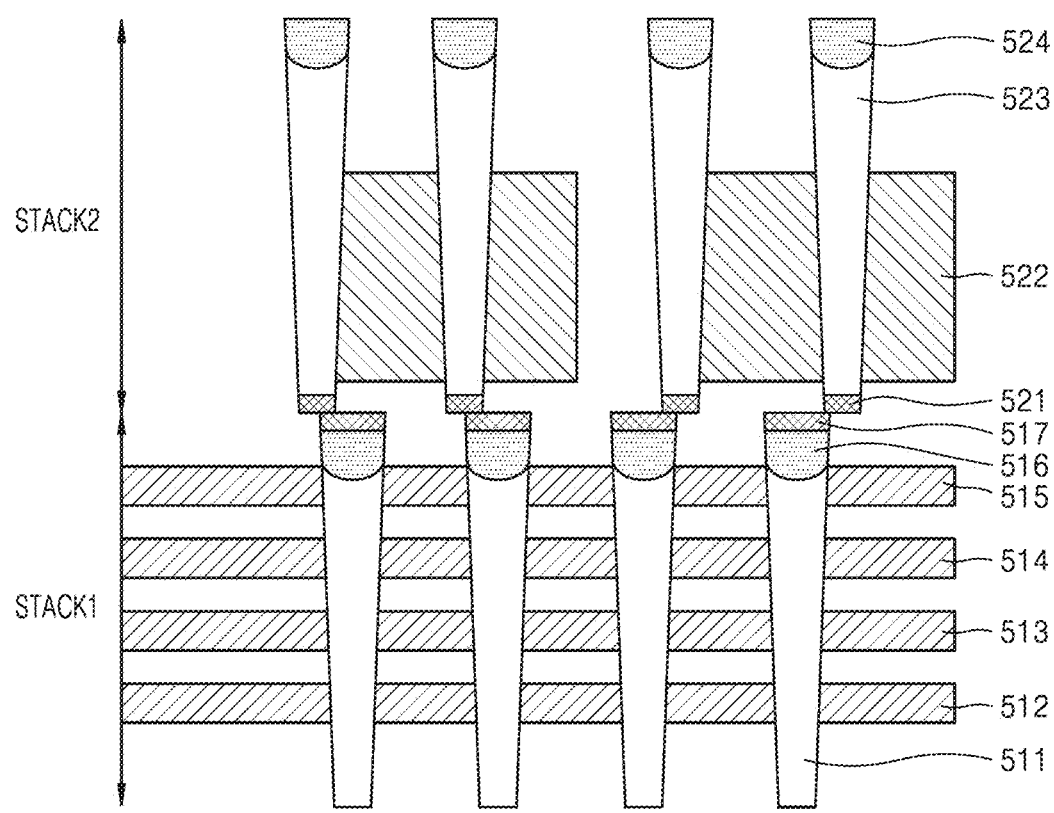
FIG. 12 is a diagram for describing a cell string structure according to some example embodiments.

FIG. 12 is a diagram for describing a cell string structure according to some example embodiments. Referring to FIG. 12, a cell string may extend across a first stack STACK1 and a second stack STACK2. The first stack STACK1 may include a first channel hole 511, a plurality of word lines 512 to 515, a first conductive plug 516, and a first metal layer 517.

The plurality of word lines 512 to 515 may include a metal such as tungsten, nickel, cobalt, or tantalum, a metal silicide such as a tungsten silicide, a nickel silicide, a cobalt silicide, or a tantalum silicide, or any combination thereof.

The first channel hole 511 may be connected to a second channel hole 523 through the first conductive plug 516, the first metal layer 517, and a second metal layer 521. Also, the first channel hole 511 may include memory cell transistors connected to the plurality of word lines 512 to 515.

The second stack STACK2 may include a second channel hole 523, a second metal layer 521, a second conductive plug 524, and a string selection line 522.

The second channel hole 523 may include a string selection transistor connected to the string selection line 522.

In some example embodiments, the string selection line 522 may include a material different from the material of the plurality of word lines 512 to 515. For example, the string selection line may include polysilicon. The string selection line 522 may be formed in a separate process from the process of forming the plurality of word lines 512 to 515; however, the inventive concepts are not limited thereto.

Figure 13:
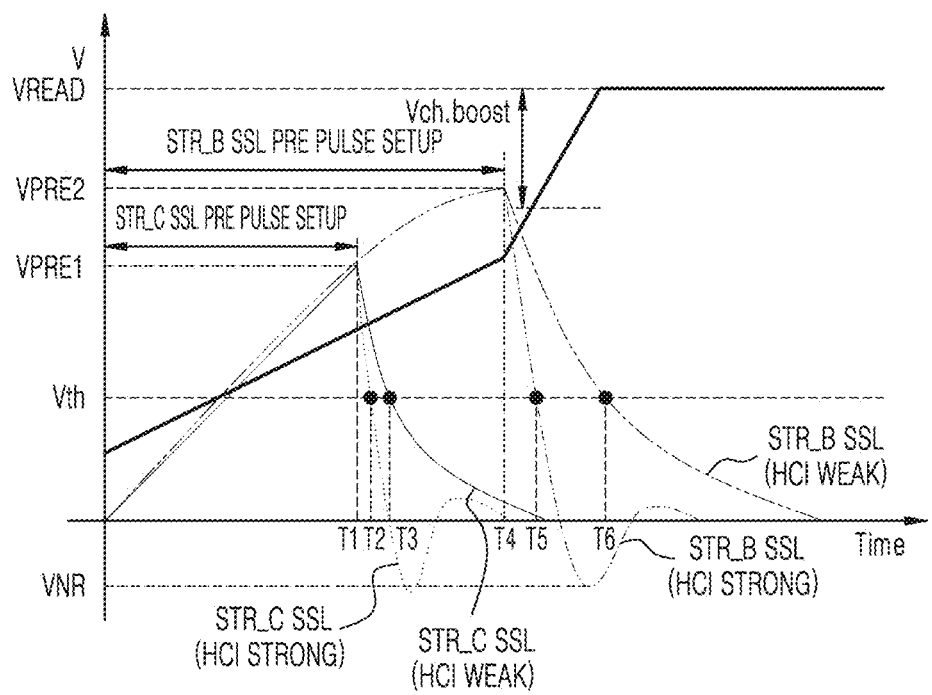
FIG. 13 is a diagram for describing a pre pulse recovery operation according to some example embodiments.

FIG. 13 is a diagram for describing a pre pulse recovery operation according to some example embodiments. FIG. 13 may represent a pre pulse recovery operation of a cell string having the structure of FIG. 12. FIG. 13 may be described with reference to FIGS. 6 and 12.

Referring to FIG. 13, voltages of a B string selection line STR_B SSL, a C string selection line STR_C SSL, and an unselected word line UNSEL WL are illustrated with time. The B string selection line STR_B SSL may refer to a string selection line connected to a B string, and the C string selection line STR_C SSL may refer to a string selection line connected to a C string. Here, the B string may refer to a cell string having the same threshold voltage distribution as a selected cell string among the unselected cell strings for each ground selection line. For example, in FIG. 6, the threshold voltage distribution for each of the ground selection lines GSL1 and GSL2 of the first cell string ST1 and the threshold voltage distribution for each of the ground selection lines GSL1 and GSL2 of the second cell string ST2 may be equal to each other. In this case, when the first cell string ST1 is the selected cell string, the second cell string ST2 may be the B string. The C string may refer to a cell string having a different threshold voltage distribution than a selected cell string among the unselected cell strings for each ground selection line. For example, in FIG. 6, the C string may be the seventh cell string ST7 having a different threshold voltage distribution than the first cell string ST1 for each of the ground selection lines GSL1 and GSL2.

The third voltage may be applied to the B string selection line STR_B SSL until the fourth time T4 to increase the voltage thereof to the second pre pulse voltage VPRE2. The period from the time at which the third voltage is applied to the B string selection line STR_B SSL to the fourth time T4 may be referred to as a B string pre pulse setup period STR_B SSL PRE PULSE SETUP. After the fourth time T4, a first negative voltage may be applied to the first unselected string selection line corresponding to the first process characteristic among the B string selection lines STR_B SSL to perform a pre pulse recovery operation. The first negative voltage may be applied until the voltage of the first unselected string selection line reaches a negative recovery voltage VNR. The voltage of the first unselected string selection line may decrease to a threshold voltage Vth of the string selection transistor at the fifth time T5 to turn off the string selection transistor. Here, the first process characteristic may refer to a process characteristic resistant to hot carrier injection (HCI STRONG).

When the string selection transistor is turned off, the channel of the cell string may be boosted. The channel of the cell string may be boosted by a difference Vch.boost between the voltage of the unselected word line UNSEL WL and the read pass voltage VREAD at the time when the string selection transistor is turned off.

After the fourth time T4, a fourth voltage (e.g., the ground voltage) higher than the first negative voltage and lower than the third voltage may be applied to the second unselected string selection line corresponding to the second process characteristic among the B string selection lines STR_B SSL to perform a pre pulse recovery operation. The voltage of the second unselected string selection line may decrease to the threshold voltage Vth of the string selection transistor at the sixth time T6 to turn off the string selection transistor. Here, the second process characteristic may refer to a process characteristic vulnerable to hot carrier injection (HCI WEAK).

The third voltage may be applied to the C string selection line STR_C SSL until the first time T1 to increase the voltage thereof to the first pre pulse voltage VPRE1. The period from the time at which the third voltage is applied to the C string selection line STR_C SSL to the first time T1 may be referred to as a C string pre pulse setup period STR_C SSL PRE PULSE SETUP. After the first time T1, the first negative voltage may be applied to the third unselected string selection line corresponding to the first process characteristic among the C string selection lines STR_C SSL to perform a pre pulse recovery operation. The first negative voltage may be applied until the voltage of the third unselected string selection line reaches the negative recovery voltage VNR. The voltage of the third unselected string selection line may decrease to the threshold voltage Vth of the string selection transistor at the second time T2 to turn off the string selection transistor. Here, the first process characteristic may refer to a process characteristic resistant to hot carrier injection (HCI STRONG).

After the first time T1, the fourth voltage (e.g., the ground voltage) higher than the first negative voltage may be applied to the fourth unselected string selection line corresponding to the second process characteristic among the C string selection lines STR_C SSL to perform a pre pulse recovery operation. The voltage of the fourth unselected string selection line may decrease to the threshold voltage Vth of the string selection transistor at the third time T3 to turn off the string selection transistor. Here, the second process characteristic may refer to a process characteristic vulnerable to hot carrier injection (HCI WEAK).

Figure 14:
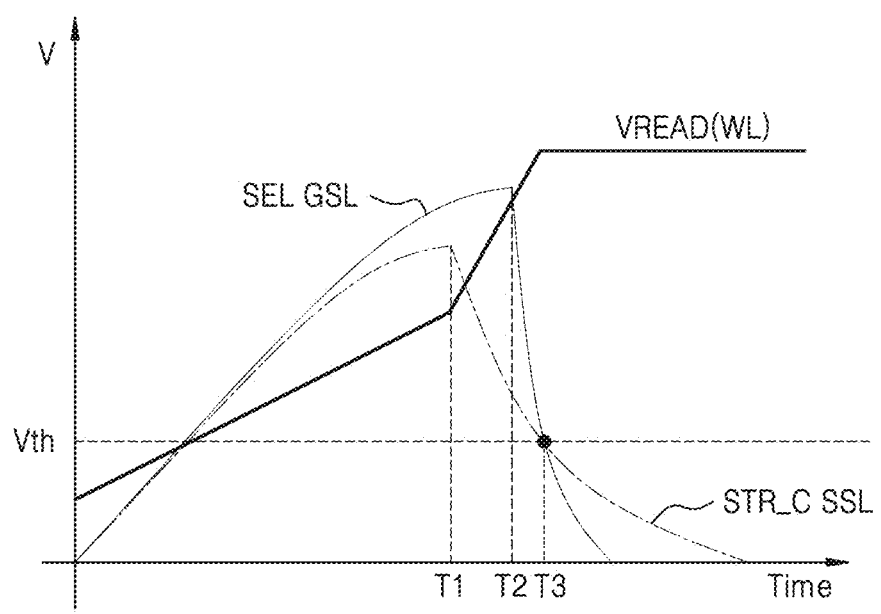
FIG. 14 is a diagram for describing a pre pulse recovery operation according to some example embodiments.

FIG. 14 is a diagram for describing a pre pulse recovery operation according to some example embodiments. FIG. 14 may illustrate a pre pulse recovery operation of a ground selection line and a string selection line when both the coded GSL structure of FIG. 6 and the cell string structure of FIG. 12 are applied thereto. FIG. 14 may be described with reference to FIGS. 1, 6, 12, and 13. FIG. 14 illustrates a pre pulse recovery operation of the C string to which the selected ground selection line of FIG. 6 and the cell string structure of FIG. 12 are applied. However, this is merely an example, and a pre pulse recovery operation of the B string to which the selected ground selection line of FIG. 6 and the cell string structure of FIG. 12 are applied may be described with reference to FIG. 14.

Referring to FIG. 14, a pre pulse setup operation may be performed on the C string selection line STR_C SSL by applying the third voltage to the C string selection line STR_C SSL until the first time T1. A pre pulse recovery operation of the C string selection line STR_C SSL may be performed after the first time T1. After the first time T1, the voltage of the C string selection line STR_C SSL may decrease to reach the threshold voltage Vth of the string selection transistor at the third time T3, and the string selection transistor may be turned off.

A pre pulse setup operation may be performed on the selected ground selection line SEL GSL by applying the third voltage to the selected ground selection line SEL GSL until the second time T2 later than the first time T1. A pre pulse recovery operation of the selected ground selection line SEL_GSL may be performed after the second time T2. After the second time T2, the voltage of the selected ground selection line SEL GSL may decrease to reach the threshold voltage of the ground selection transistor at the third time T3, and the ground selection transistor may be turned off.

As described with reference to FIG. 14, when both the coded GSL structure of FIG. 6 and the cell string structure of FIG. 12 are applied, the time required for the pre pulse recovery operation of the string selection line may be longer than the time required for the pre pulse recovery operation of the ground selection line. Thus, for example, the pre pulse recovery manager 124-1 may control the pre pulse recovery start timing of the string selection line and the ground selection line as illustrated in FIG. 14.

Figure 15:
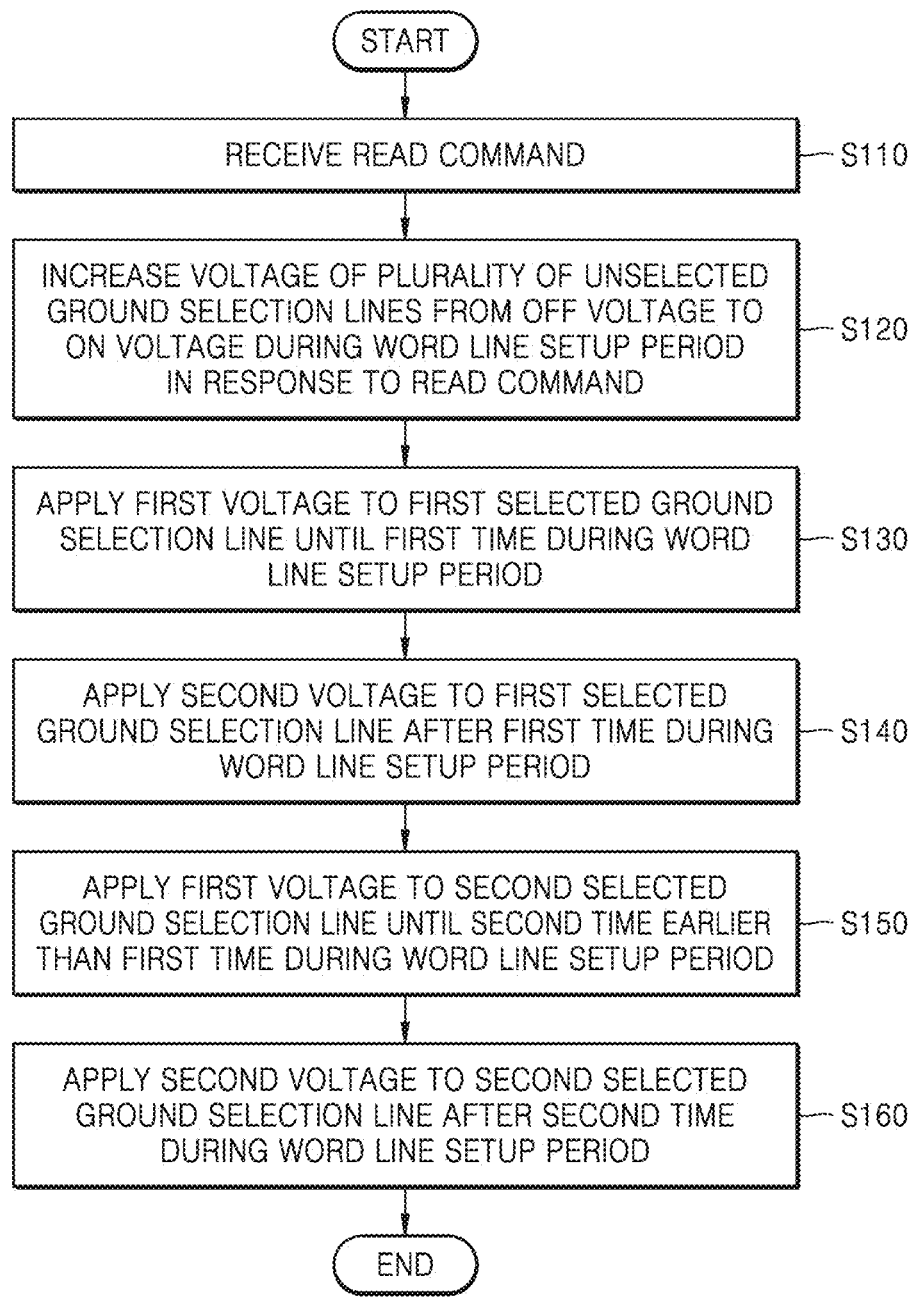
FIG. 15 is a flowchart illustrating an operating method of a nonvolatile memory device according to some example embodiments.

FIG. 15 is a flowchart illustrating an operating method of a nonvolatile memory device according to some example embodiments.

FIG. 15 may represent a case where the pre pulse recovery start timing is adjusted as illustrated in FIG. 10B. FIG. 15 may be described with reference to FIGS. 1 and 10B.

In operation S110, the nonvolatile memory device may receive a read command. For example, the nonvolatile memory device may receive the read command from the memory controller of FIG. 1.

In operation S120, in response to the read command, the nonvolatile memory device may increase the voltage of the plurality of unselected ground selection lines from the off voltage to the on voltage during the word line setup period, as illustrated in FIG. 9.

In operation S130, the nonvolatile memory device may apply the first voltage to the first selected ground selection line until the first time in the word line setup period. Here, the first selected ground selection line may refer to a first process characteristic resistant to hot carrier injection, and the first voltage may refer to a voltage for performing a pre pulse setup operation on the first selected ground selection line.

In operation S140, the nonvolatile memory device may apply the second voltage lower than the first voltage to the first selected ground selection line after the first time in the word line setup period. The second voltage may refer to a voltage for performing a pre pulse recovery operation on the first selected ground selection line.

In operation S150, the nonvolatile memory device may apply the first voltage to the second selected ground selection line until the second time earlier than the first time in the word line setup period. Here, the second selected ground selection line may refer to a second process characteristic resistant to hot carrier injection, and the first voltage may refer to a voltage for performing a pre pulse setup operation on the second selected ground selection line.

In operation S160, the nonvolatile memory device may apply the second voltage to the second selected ground selection line after the second time in the word line setup period. The second voltage may refer to a voltage for performing a pre pulse recovery operation on the second selected ground selection line.

By adjusting the timing at which the pre pulse recovery operation starts according to the first process characteristic or the second process characteristic, the memory device may reduce the hot carrier injection and may reduce the time and power required for the pre pulse recovery operation. Also, the memory device may improve the performance of the memory device, such as a read speed, by reducing the hot carrier injection.

Figure 16:
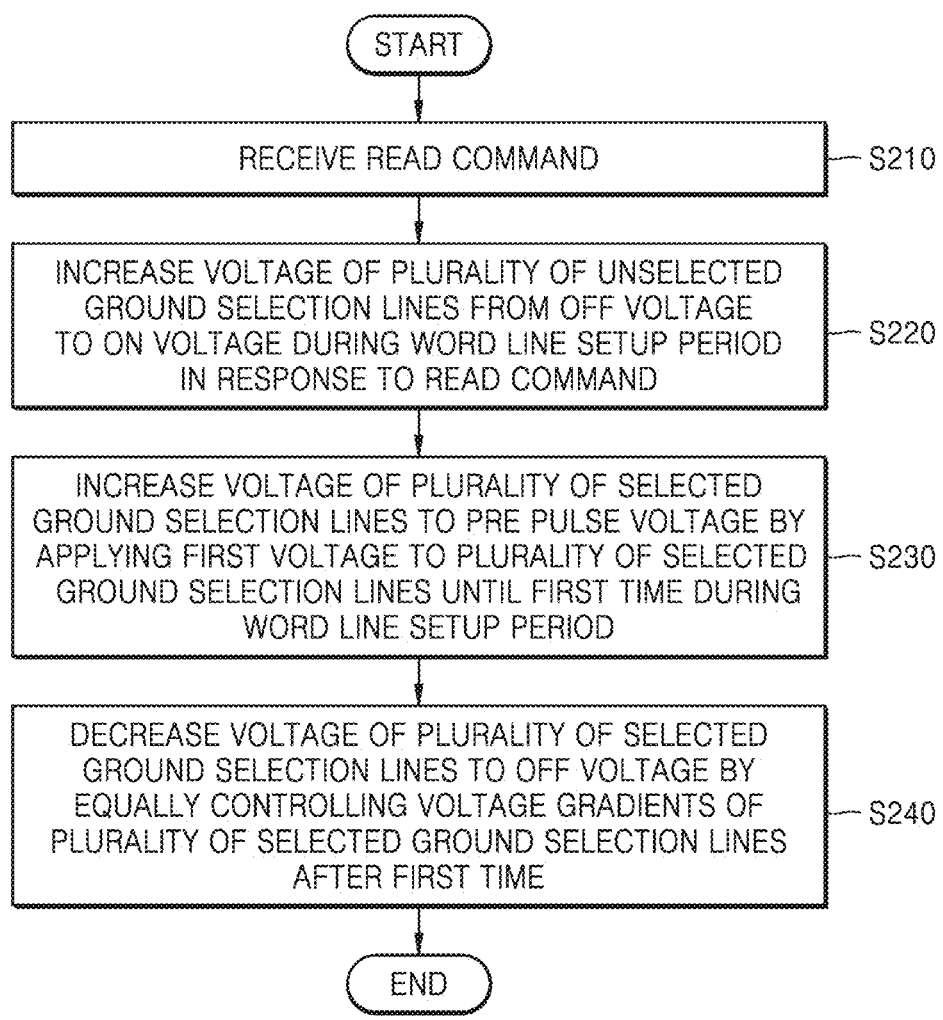
FIG. 16 is a flowchart illustrating an operating method of a nonvolatile memory device according to some example embodiments.

FIG. 16 is a flowchart illustrating an operating method of a memory device according to some example embodiments.

FIG. 16 may represent a case where the pre pulse recovery gradient is adjusted as illustrated in FIG. 11. FIG. 16 may be described with reference to FIGS. 1 and 10B.

In operation S210, the nonvolatile memory device may receive a read command. For example, the nonvolatile memory device may receive the read command from the memory controller of FIG. 1.

In operation S220, in response to the read command, the nonvolatile memory device may increase the voltage of the plurality of unselected ground selection lines from the off voltage to the on voltage during the word line setup period.

In operation S230, the nonvolatile memory device may increase the voltage of the plurality of selected ground selection lines to the pre pulse voltage by applying the first voltage to the plurality of selected ground selection lines until the first time in the word line setup period. Here, the first voltage may refer to a voltage for pre-pulse-setting up the plurality of selected ground selection lines.

In operation S240, after the first time, the nonvolatile memory device may decrease the voltage of the plurality of selected ground selection lines to the off voltage by equally controlling the voltage gradients of the plurality of selected ground selection lines, as described with reference to FIG. 10B.

By equally controlling the voltage gradients of the plurality of selected ground selection lines, the nonvolatile memory device may reduce the hot carrier injection and may reduce the time and power required for the pre pulse recovery operation. Also, the nonvolatile memory device may improve the performance of the memory device, such as a read speed, by reducing the hot carrier injection.

Figure 17:
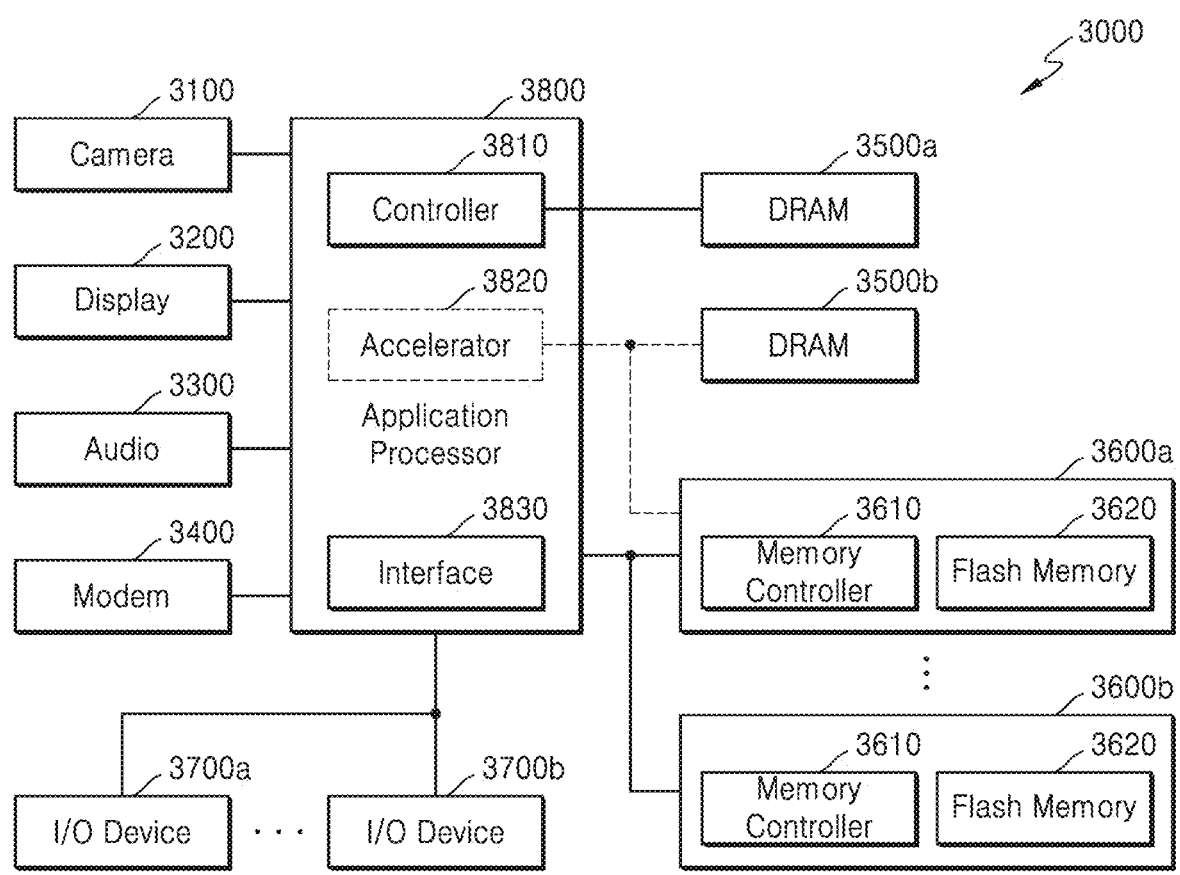
FIG. 17 is a block diagram illustrating a system including a nonvolatile memory device according to example embodiments.

FIG. 17 is a block diagram illustrating a system including a nonvolatile memory device according to example embodiments.

Referring to FIG. 17, a system 3000 may include a camera 3100, a display 3200, audio 3300, modem 3400, DRAM s3500*a* and 3500*b*, flash memories 3600*a* and 3600*b* (each including a memory controller 3610 and flash memory 3620), I/O devices 3700*a* and 3700*b*, and an application processor (AP) 3800 (including a controller 3810, accelerator chip 3820, and interface 3830). In some example embodiments, a plurality of conceptual hardware components included in the system 3000 are illustrated; however, the inventive concepts are not limited thereto, and other components may also be included therein.

Only DRAMs 3500*a* and 3500*b* are illustrated in FIG. 17; however, the inventive concepts are not limited thereto, and any memory such as PRAM, SRAM, MRAM, RRAM, FRAM, or Hybrid RAM may be used when the bandwidth, response speed, and voltage conditions of an AP 3800 or an accelerator chip 3820 are satisfied. The DRAMs 3500*a* and 3500*b* may have a relatively smaller latency and bandwidth than I/O devices 3700*a* and 3700*b* or flash memories 3600*a* and 3600*b*. When a system 3000 is powered on, the DRAMs 3500*a* and 3500*b* may be initialized and loaded with an operating system and application data to be used as a temporary storage space for the operating system and application data or used as an execution space for various software codes.

In the DRAMs 3500a and 3500b, addition/subtraction/multiplication/division operations, vector operations, address operations, and/or Fast Fourier Transform (FFT) operations may be performed. Also, a function for execution used for inference may be performed in the DRAMs 3500a and 3500b. Here, the inference may be performed in a deep learning algorithm using an artificial neural network. The deep learning algorithm may include a training operation for training a model through various data and an inference operation for recognizing data with the trained model. As some example embodiments, an image captured by a user through a camera 3100 may be signal-processed and stored in the DRAM 3500b, and an accelerator block or the accelerator chip 3820 may perform an AI data operation for recognizing data by using data stored in the DRAM 3500b and a function used for inference.

The system 3000 may include a plurality of storages or a plurality of flash memories 3600a and 3600b having a larger capacity than the DRAMs 3500a and 3500b. The accelerator block or the accelerator chip 3820 may perform a training operation and an AI data operation by using the flash memories 3600a and 3600b. In some example embodiments, by using an operation device included in a memory controller 3610, the flash memories 3600a and 3600b may improve or more efficiently perform a training operation and an inference AI data operation performed by the AP 3800 and/or the accelerator chip 3820. The flash memories 3600a and 3600b may store a picture taken through the camera 3100 or may store data received through a data network. For example, the flash memories 3600a and 3600b may store augmented reality/virtual reality, high definition (HD), or ultra-high definition (UHD) content.

The flash memories 3600a and 3600b may include the control circuit described with reference to FIGS. 1 and 2. The control circuit may perform control such that a pre pulse recovery operation is performed after a pre pulse on the word line, the string selection line, the ground selection line, and/or the like connected to the cell strings.

In some example embodiments, the control circuit may perform control such that the first voltage is applied to the first selected ground selection line corresponding to the first process characteristic among the plurality of selected ground selection lines connected to the memory cell array until the first time in the word line setup period.

The control circuit may control the pre pulse recovery operation by performing control such that the second voltage lower than the first voltage is applied to the first selected ground selection line after the first time in the word line setup period.

Also, the control circuit may perform control such that the first voltage is applied to the second selected ground selection line corresponding to the second process characteristic among the plurality of selected ground selection lines until the second time earlier than the first time in the word line setup period and the second voltage is applied to the second selected ground selection line after the second time in the word line setup period.

In some example embodiments, the control circuit may perform control such that the voltage of the plurality of selected ground selection lines increases to the pre pulse voltage by applying the first voltage to the plurality of selected ground selection lines until the first time in the word line setup period and the voltage thereof decreases to the off voltage by equally controlling the voltage gradients of the selected ground selection lines after the first time.

When the terms "about" or "substantially" are used in this specification in connection with a numerical value, it is intended that the associated numerical value includes a manufacturing or operational tolerance (e.g., +10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., +10%) around the stated numerical values or shapes.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

While the inventive concepts have been particularly illustrated and described with reference to example embodiments thereof, it will be understood that various changes in form and details may be made therein without departing from the spirit and scope of the following claims.

What is claimed is:

1. An operating method of a nonvolatile memory device comprising a plurality of cell strings connected to a plurality of word lines, a plurality of string selection lines, and a plurality of ground selection lines, the operating method comprising:
  receiving a read command;
  in response to the read command, increasing a voltage of a plurality of unselected ground selection lines among the plurality of ground selection lines from an off voltage to an on voltage during a word line setup period;
  applying a first voltage to a first selected ground selection line corresponding to a first process characteristic among a plurality of selected ground selection lines until a first time in the word line setup period;
  applying a second voltage lower than the first voltage to the first selected ground selection line after the first time in the word line setup period;
  applying the first voltage to a second selected ground selection line corresponding to a second process characteristic among the plurality of selected ground selection lines, until a second time earlier than the first time in the word line setup period; and applying the second voltage to the second selected ground selection line after the second time in the word line setup period.

2. The operating method of claim 1, further comprising:
applying the first voltage to a third selected ground selection line among the plurality of selected ground selection lines until a third time later than the first time in the word line setup period; and
applying the second voltage to the third selected ground selection line after the third time in the word line setup period,
wherein
each of the first selected ground selection line and the second selected ground selection line is adjacent to one of the plurality of unselected ground selection lines, and
the third selected ground selection line is not adjacent to the plurality of unselected ground selection lines.

3. The operating method of claim 2, wherein each of the plurality of selected ground selection lines and the plurality of unselected ground selection lines is connected to transistors having a first threshold voltage lower than the second voltage or a second threshold voltage higher than the second voltage.

4. The operating method of claim 3, wherein
the applying of the second voltage to the first selected ground selection line comprises applying the second voltage to a first transistor which is included in a first unselected cell string among the plurality of cell strings, is connected to the first selected ground selection line, and has the second threshold voltage, to turn off the first transistor, and
the applying of the second voltage to the second selected ground selection line comprises applying the second voltage to a second transistor which is included in a second unselected cell string among the plurality of cell strings, is connected to the second selected ground selection line, and has the second threshold voltage, to turn off the second transistor.

5. The operating method of claim 4, wherein a time at which the first transistor is turned off is the same as a time at which the second transistor is turned off.

6. The operating method of claim 1, wherein each of the first process characteristic and the second process characteristic includes at least one of a diameter of a channel connected to the plurality of ground selection lines, a word line thickness, an inter-wordline distance, or a wordline-to-channel distance.

7. The operating method of claim 6, wherein the first process characteristic corresponds to a diameter of a first channel, and the second process characteristic corresponds to a diameter of a second channel smaller than the diameter of the first channel.

8. The operating method of claim 1, further comprising:
applying a third voltage to first string selection lines corresponding to the plurality of selected ground selection lines among the plurality of string selection lines, until a fourth time earlier than the second time in the word line setup period;
applying a first negative voltage to a first unselected string selection line corresponding to the first process characteristic among the first string selection lines, after the fourth time in the word line setup period;
applying the third voltage to second string selection lines corresponding to the plurality of unselected ground selection lines among the plurality of string selection lines, until a fifth time earlier than the fourth time in the word line setup period; and
applying the first negative voltage to a second unselected string selection line corresponding to the first process characteristic among the second string selection lines, after the fifth time in the word line setup period.

9. The operating method of claim 8, further comprising:
applying a fourth voltage higher than the first negative voltage to a third unselected string selection line corresponding to the second process characteristic among the first string selection lines, after the fourth time in the word line setup period; and
applying the fourth voltage to a fourth unselected string selection line corresponding to the second process characteristic among the second string selection lines, after the fifth time in the word line setup period.

10. The operating method of claim 8, wherein each of the plurality of string selection lines comprises polysilicon.

11. An operating method of a nonvolatile memory device comprising a plurality of cell strings connected between a plurality of bit lines and a plurality of common source lines, the operating method comprising:
receiving a read command;
in response to the read command, increasing a voltage of a plurality of unselected ground selection lines from an off voltage to an on voltage during a word line setup period;
increasing a voltage of a plurality of selected ground selection lines to a pre pulse voltage by applying a first voltage to the plurality of selected ground selection lines until a first time in the word line setup period; and
decreasing the voltage of the plurality of selected ground selection lines to the off voltage by equally controlling a voltage gradient after the first time.

12. The operating method of claim 11, wherein each of the plurality of selected ground selection lines and the plurality of unselected ground selection lines is connected to transistors having a first threshold voltage or a second threshold voltage higher than the first threshold voltage.

13. The operating method of claim 12, wherein the decreasing of the voltage of the plurality of selected ground selection lines to the off voltage comprises turning off a first transistor which is included in an unselected cell string among the plurality of cell strings and has the second threshold voltage, by equally controlling a voltage gradient of the plurality of selected ground selection lines.

14. A nonvolatile memory device comprising:
a memory cell array comprising a plurality of cell strings connected to a plurality of word lines, a plurality of string selection lines, and a plurality of ground selection lines; and
a control circuit configured to control the memory cell array such that
a voltage of a plurality of unselected ground selection lines among the plurality of ground selection lines increases from an off voltage to an on voltage during a word line setup period,
in response to a read command, a first voltage is applied to a first selected ground selection line corresponding to a first process characteristic among a plurality of selected ground selection lines until a first time in the word line setup period, a second voltage is applied to the first selected ground selection line after the first time in the word line setup period, the first voltage being applied to a second selected ground selection line corresponding to a second process characteristic among the plurality of selected ground selection lines until a second time earlier than the first time in the word line setup period, and the second voltage is applied to the second selected ground selection line after the second time in the word line setup period.

15. The nonvolatile memory device of claim 14, wherein each of the first selected ground selection line and the second selected ground selection line is adjacent to one of the plurality of unselected ground selection lines,
a third selected ground selection line is not adjacent to the plurality of unselected ground selection lines, and
the control circuit is configured to control the memory cell array such that the first voltage is applied to the third selected ground selection line until a third time later than the first time in the word line setup period, and the second voltage is applied to the third selected ground selection line after the third time in the word line setup period.

16. The nonvolatile memory device of claim 15, wherein each of the plurality of selected ground selection lines and the plurality of unselected ground selection lines is connected to transistors having a first threshold voltage lower than the second voltage or a second threshold voltage higher than the second voltage.

17. The nonvolatile memory device of claim 16, wherein the control circuit is configured to control the memory cell array such that the second voltage is applied to a first transistor which is included in an unselected cell string among the plurality of cell strings, is connected to the first selected ground selection line, and has the second threshold voltage, to turn off the first transistor, and the second voltage is applied to a second transistor which is included in the unselected cell string, is connected to the second selected ground selection line, and has the second threshold voltage, to turn off the second transistor.

18. The nonvolatile memory device of claim 17, wherein the control circuit is configured to control the memory cell array such that a time at which the first transistor is turned off is the same as a time at which the second transistor is turned off.

19. The nonvolatile memory device of claim 14, wherein each of the first process characteristic and the second process characteristic includes at least one of: a diameter of a channel connected to the plurality of ground selection lines; a word line thickness; an inter-wordline distance; or a wordline-to-channel distance.

20. The nonvolatile memory device of claim 19, wherein the first process characteristic corresponds to a diameter of a first channel, and the second process characteristic corresponds to a diameter of a second channel smaller than the diameter of the first channel.

* * * * *